(12) United States Patent
Zhang et al.

(10) Patent No.: US 12,139,164 B2
(45) Date of Patent: Nov. 12, 2024

(54) VALIDATING VEHICLE SENSOR CALIBRATION

(71) Applicant: Lyft, Inc., San Francisco, CA (US)

(72) Inventors: Lei Zhang, Sunnyvale, CA (US); Li Jiang, Cupertino, CA (US); Lukas Platinsky, London (GB); Karim Tarek Mahmoud Elsayed Ahmed Shaban, London (GB)

(73) Assignee: Lyft, Inc., San Francisco, CA (US)

( * ) Notice: Subject to any disclaimer, the term of this patent is extended or adjusted under 35 U.S.C. 154(b) by 691 days.

(21) Appl. No.: 17/127,882

(22) Filed: Dec. 18, 2020

(65) Prior Publication Data

US 2022/0194412 A1 Jun. 23, 2022

(51) Int. Cl.
| | |
|---|---|
| B60W 60/00 | (2020.01) |
| G01S 7/497 | (2006.01) |
| G01S 17/86 | (2020.01) |
| G06V 20/56 | (2022.01) |

(52) U.S. Cl.
CPC .......... B60W 60/001 (2020.02); G06V 20/56 (2022.01); *B60W 2420/403* (2013.01); *B60W 2420/408* (2024.01)

(58) Field of Classification Search
CPC ......... B60W 60/001; B60W 2420/403; B60W 2420/408; G06V 20/56; G01S 7/4972; G01S 17/86; G01S 17/931
USPC .......................................................... 701/23
See application file for complete search history.

(56) References Cited

U.S. PATENT DOCUMENTS

| | | | |
|---|---|---|---|
| 2020/0064483 A1* | 2/2020 | Li | G01S 13/865 |
| 2021/0287022 A1* | 9/2021 | Ferroni | G06V 20/58 |
| 2021/0398338 A1* | 12/2021 | Philion | G06N 3/08 |

OTHER PUBLICATIONS

Heng et al. Infrastructure-Based Calibration of a Multi-Camera Rig. Proceedings—IEEE International Conference on Robotics and Automation, May 2014, pp. 1-8 [online]. Retrieved from the Internet <URL:https://www.researchgate.net/publication/265683165_Infrastructure-Based_Calibration_of_a_Multi-Camera_Rig>.

(Continued)

*Primary Examiner* — Tyler D Paige
(74) *Attorney, Agent, or Firm* — Lee Sullivan Shea & Smith LLP

(57) ABSTRACT

Examples disclosed herein involve a computing system configured to (i) obtain first sensor data captured by a first sensor of a vehicle during a given period of operation of the vehicle (ii) obtain second sensor data captured by a second sensor of the vehicle during the given period of operation of the vehicle, (iii) based on the first sensor data, localize the first sensor within a first coordinate frame of a first map layer, (iv) based on the second sensor data, localize the second sensor within a second coordinate frame of a second map layer, (v) based on a known transformation between the first coordinate frame and the second coordinate frame, determine respective poses for the first sensor and the second sensor in a common coordinate frame, and (vi) determine (a) a translation and (b) a rotation between the respective poses for the first and second sensors in the common coordinate frame.

20 Claims, 10 Drawing Sheets

(56) References Cited

OTHER PUBLICATIONS

Olsen, Edwin B. Real-Time Correlative Scan Matching. University of Michigan: Department of Electrical Engineering and Computer Science—IEEE International Conference on Robotics and Automation, May 2009, pp. 7 [online]. Retrieved from the Internet <URL:https://april.eecs.umich.edu/pdfs/olson2009icra.pdf>.

\* cited by examiner

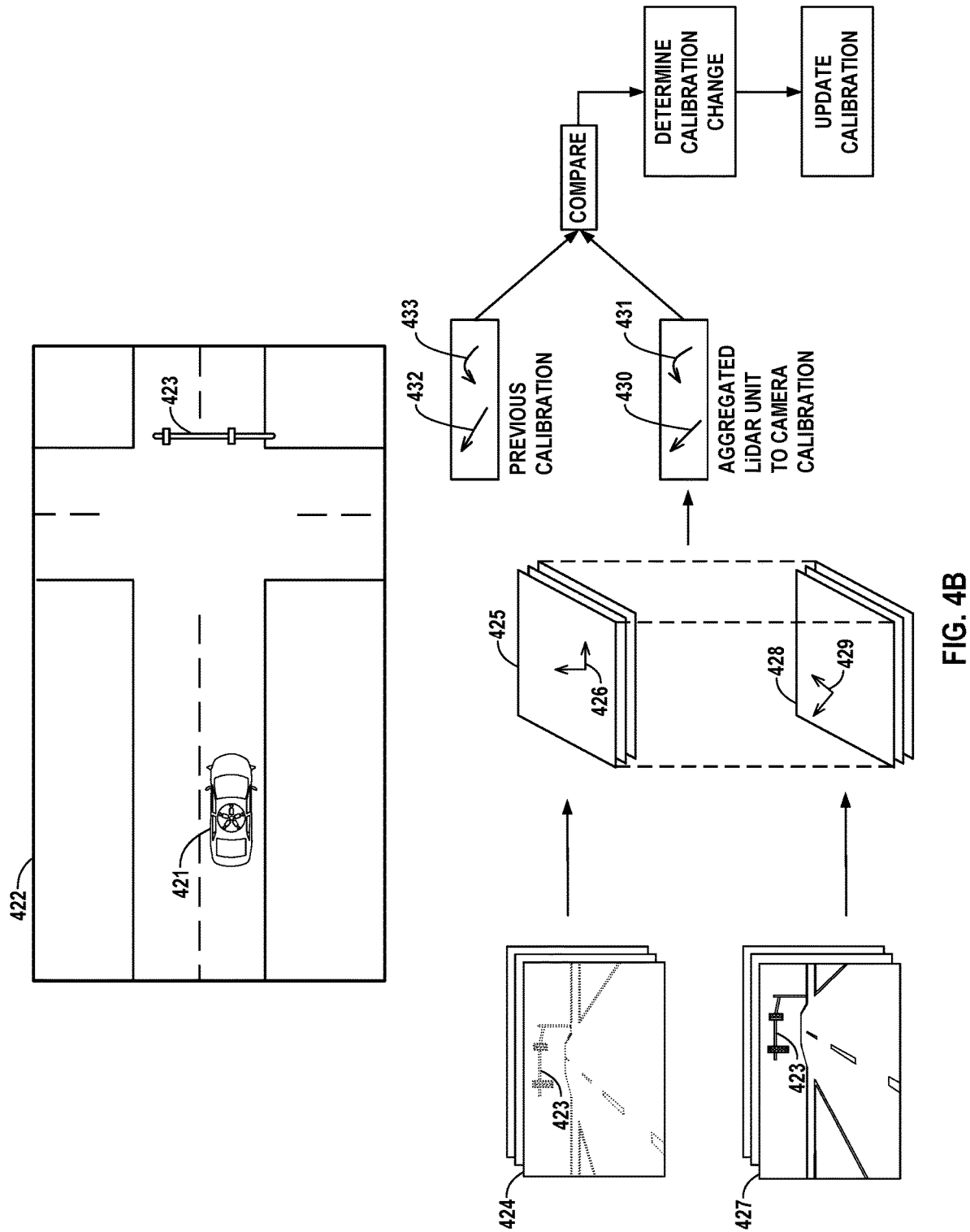

VALIDATING VEHICLE SENSOR CALIBRATION

BACKGROUND

Vehicles are increasingly being equipped with sensors that capture sensor data while such vehicles are operating in the real world, and this captured sensor data may then be used for many different purposes, examples of which may include building an understanding of how vehicles and/or other types of agents (e.g., pedestrians, bicyclists, etc.) tend to behave within the real world and/or creating maps that are representative of the real world. The sensor data that is captured by these sensor-equipped vehicles may take any of various forms, examples of which include Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities.

SUMMARY

In one aspect, the disclosed technology may take the form of a method that involves (i) obtaining first sensor data captured by a first sensor of a vehicle during a given period of operation of the vehicle (ii) obtaining second sensor data captured by a second sensor of the vehicle during the given period of operation of the vehicle, (iii) based on the first sensor data, localizing the first sensor within a first coordinate frame of a first map layer, (iv) based on the second sensor data, localizing the second sensor within a second coordinate frame of a second map layer, (v) based on a known transformation between the first coordinate frame and the second coordinate frame, determining respective poses for the first sensor and the second sensor in a common coordinate frame, (vi) determining (a) a translation and (b) a rotation between the respective poses for the first and second sensors in the common coordinate frame, and (vii) determining a calibration between the first sensor and the second sensor based on the determined (a) translation and (b) rotation between the respective poses for the first sensor and the second sensor in the common coordinate frame.

In some example embodiments, the vehicle may be stationary during the given period of operation.

Further, in example embodiments, the method may involve comparing the determined (i) translation and (ii) rotation to a previously determined (i) translation and (ii) rotation between the respective poses for the first and second sensors in the common coordinate frame.

Further yet, in example embodiments, the method may involve determining a difference between one or both of the determined (i) translation and (ii) rotation and the previously determined (i) translation and (ii) rotation between respective poses for the first and second sensors and based on the difference, determining a change to the determined calibration between the first sensor and the second sensor.

Still further, in some example embodiments, the method may involve, based on the difference between one or both of the determined (i) translation and (ii) rotation and the previously determined (i) translation and (ii) rotation between respective poses for the first and second sensors updating the determined calibration between the first sensor and the second sensor to incorporate the difference.

Still further, in some example embodiments, the method may involve determining that the difference exceeds a threshold difference between one or both of the determined (i) translation and (ii) rotation and the previously determined (i) translation and (ii) rotation and, based on determining that the difference exceeds the threshold difference, generating a notification comprising an indication of the change to the determined calibration between the first sensor and the second sensor.

Still further, in some example embodiments, the first sensor is a LiDAR unit and the first map layer is a LiDAR-based map layer, and wherein the second sensor is a camera and the second map layer is an image-based map layer.

Still further, in some example embodiments, the common coordinate frame is one of the first coordinate frame of the first map layer or the second coordinate frame of the second map layer.

Still further, in some example embodiments, the known transformation between the first coordinate frame and the second coordinate frame is determined during creation of a combined map comprising at least the first map layer and the second map layer.

Still further, in some example embodiments, determining (i) the translation and (ii) the rotation between the respective poses for the first and second sensors in the common coordinate frame comprises determining a series of respective (i) translations and (ii) rotations between a series of respective poses for the first and second sensors in the common coordinate frame, and determining the calibration between the first sensor and the second sensor based on the determined (i) translation and (ii) rotation between the respective poses for the first sensor and the second sensor in the common coordinate frame comprises determining the calibration between the first sensor and the second sensor based on the determined series of respective (i) translations and (ii) rotations.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 4B is a diagram that illustrates an example of a moving vehicle using captured sensor data and map data to determine a calibration between two sensors.

DETAILED DESCRIPTION

Figure 1A:
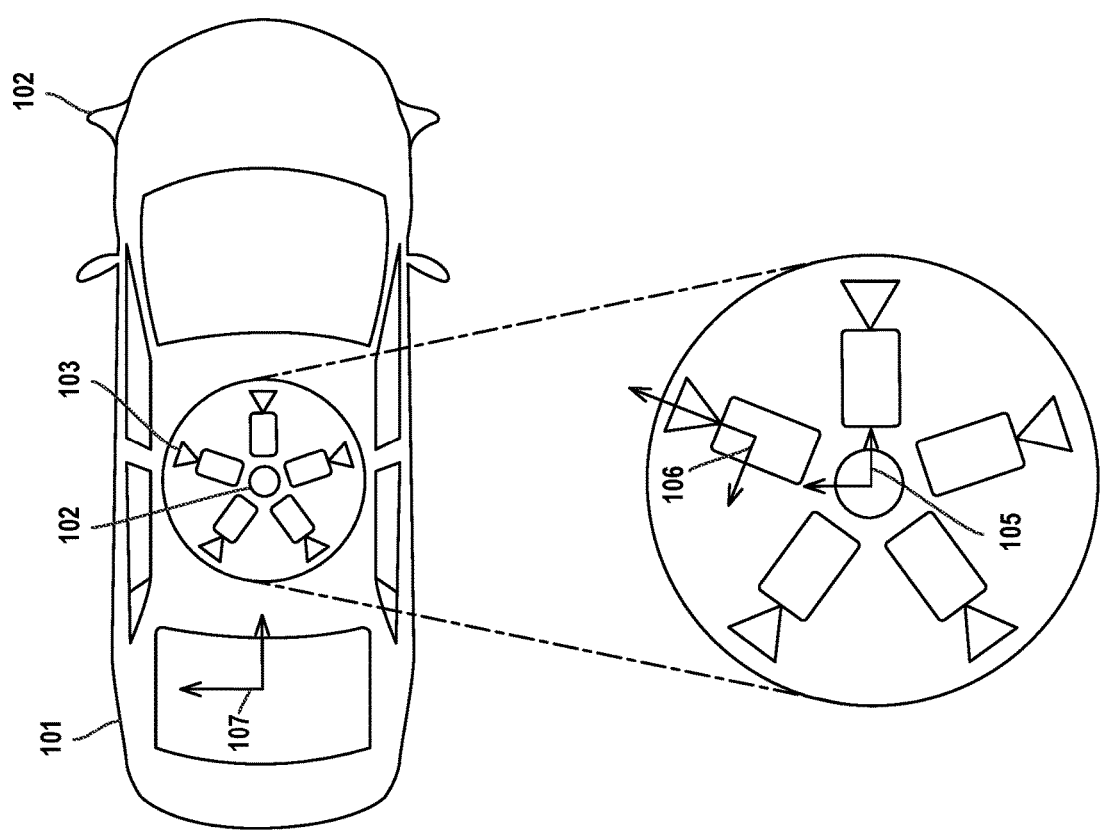
FIG. 1A is a diagram that illustrates an example vehicle that includes a LiDAR-based sensor system.

As noted above, vehicles are increasingly being equipped with sensors that capture sensor data while such vehicles are operating in the real world, such as Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities, and this captured sensor data may then be used for many different purposes. For instance, sensor data that is captured by sensor-equipped vehicles may be used to create maps that are representative of the real world, build an understanding of how vehicles and/or other types of agents (e.g., pedestrians, bicyclists, etc.) tend to behave within the real world, and/or facilitate autonomous or semi-autonomous driving of the sensor-equipped vehicle.

One important aspect of a sensor-equipped vehicle's operation is the calibration of each sensor that is included as part of the vehicle's on-board sensor system, which may directly impact the accuracy and thus the reliability of sensor data captured by the sensor(s). For instance, sensor data captured by an accurately calibrated sensor may be used to reliably estimate the location of other objects (e.g., agents and non-agents) in the vehicle's surrounding environment and/or localize the vehicle within a map for a given area. On the other hand, a less accurate sensor calibration may yield sensor data that is less accurate and may lead to relatively less reliable downstream information that is based on the sensor data. Accordingly, one challenge associated with sensor-equipped vehicles is the ability to validate whether a given sensor that is used to capture sensor data indicative of the location of objects in the vehicle's surrounding environment is maintaining a consistent calibration, and re-calibrate if it is not.

In this regard, the calibration of a given sensor may generally involve the estimation of two types of information. The first is the sensor's internal characteristics, sometimes referred to as the sensor's "intrinsics," which will typically be known based on the hardware of the specific sensor. For example, based on its make and model, a given camera sensor may have known intrinsics such as a focal length, skew, distortion, and image center, among other possibilities. Accordingly, this information may provide the basis for deriving, based on the image data captured by the camera, the location of objects with respect to the camera.

The second type of information on which the calibration of a given sensor is based is the on-vehicle position and orientation of the sensor with respect to an external reference frame, such as a vehicle reference frame. This type of information is sometimes referred to as the sensor's "extrinsics." For example, one possible vehicle reference frame may have an origin that is located at the rear axle of the vehicle. Thus, a given sensor that is mounted at a different location on the vehicle (e.g., on the vehicle's roof) will have associated extrinsics that indicate one or both of a translation and a rotation in a six-axis coordinate frame with respect to the vehicle's rear axle. Accordingly, this information may provide the basis to align the sensor data captured by the given sensor, which may be initially represented according to the sensor's own sensor-specific reference frame, with the vehicle reference frame. Further, this alignment may be performed for each sensor on the vehicle, such that the sensor data from multiple different sensors having different on-vehicle positions and orientations is represented according to the same common vehicle coordinate frame. This, in turn, may facilitate the process of fusing together the sensor data from the multiple different sensors into a cohesive representation of the vehicle's surrounding environment.

In addition, it will be recognized that once the pose of each sensor is accurately expressed with respect to the vehicle's reference frame, the poses of any two sensors may be compared to each other to determine their relative extrinsics, which may represent the on-vehicle position and orientation of one sensor with respect to the other.

One example showing the types of sensors noted above is illustrated in FIG. 1A, which depicts a vehicle 101 that is equipped with the type of LiDAR-based sensor system generally found on vehicles that are designed for autonomous or semi-autonomous driving and/or high-quality sensor data collection (e.g., for purposes of map generation). Such a LiDAR-based sensor system may include one or more LiDAR units 102, a camera array including a set of cameras 103, telematics sensors, and the like. In FIG. 1A, various sensors of the LiDAR-based sensor system are incorporated into a roof-mounted sensor rig, although other configurations are also possible. For instance, the vehicle 101 includes additional LiDAR units 102 on each of its front fenders. The vehicle 101 may include various other types of sensors as well, including one or more RADAR units and/or SONAR units, among other possibilities.

As shown in FIG. 1A, the LiDAR unit 102 has a particular on-vehicle position and orientation, which may be represented as a pose 105 with respect to the coordinate frame 107 of the vehicle, shown for reference at the rear axle of the vehicle 101. For example, and the pose 105 of the LiDAR unit 102 may be represented as a translation (e.g., in the forward and vertical directions) and a rotation (e.g., about the pitch axis) with respect to the vehicle's coordinate frame 107. Similarly, each camera 103 may have an on-vehicle position and orientation that may be represented as a pose 106 that includes a translation (e.g., translations in the forward, lateral, and vertical directions) and a rotation (e.g., about the yaw and pitch axes) with respect to the vehicle's coordinate frame 107. In this regard, it will be appreciated with reference to FIG. 1A that every sensor of the vehicle 101 will have an on-vehicle position and orientation that may be represented as a different pose with respect to the vehicle's coordinate frame 107 based on where it is affixed to the vehicle 101. Accordingly, each sensor has a different set of extrinsics that must be estimated in order to calibrate the sensor.

For tasks such as autonomous or semi-autonomous driving or generation of high-definition maps, among other similar tasks, collection of sensor data having centimeter-level precision is generally desired, and thus, the calibration of the sensors used for such collection must be equally precise. Current methods to establish an initial calibration, sometimes referred to as a "factory calibration," of sensors at this level of precision typically involve locating the vehicle within a structured environment that includes specialized calibration equipment.

Figure 1B:
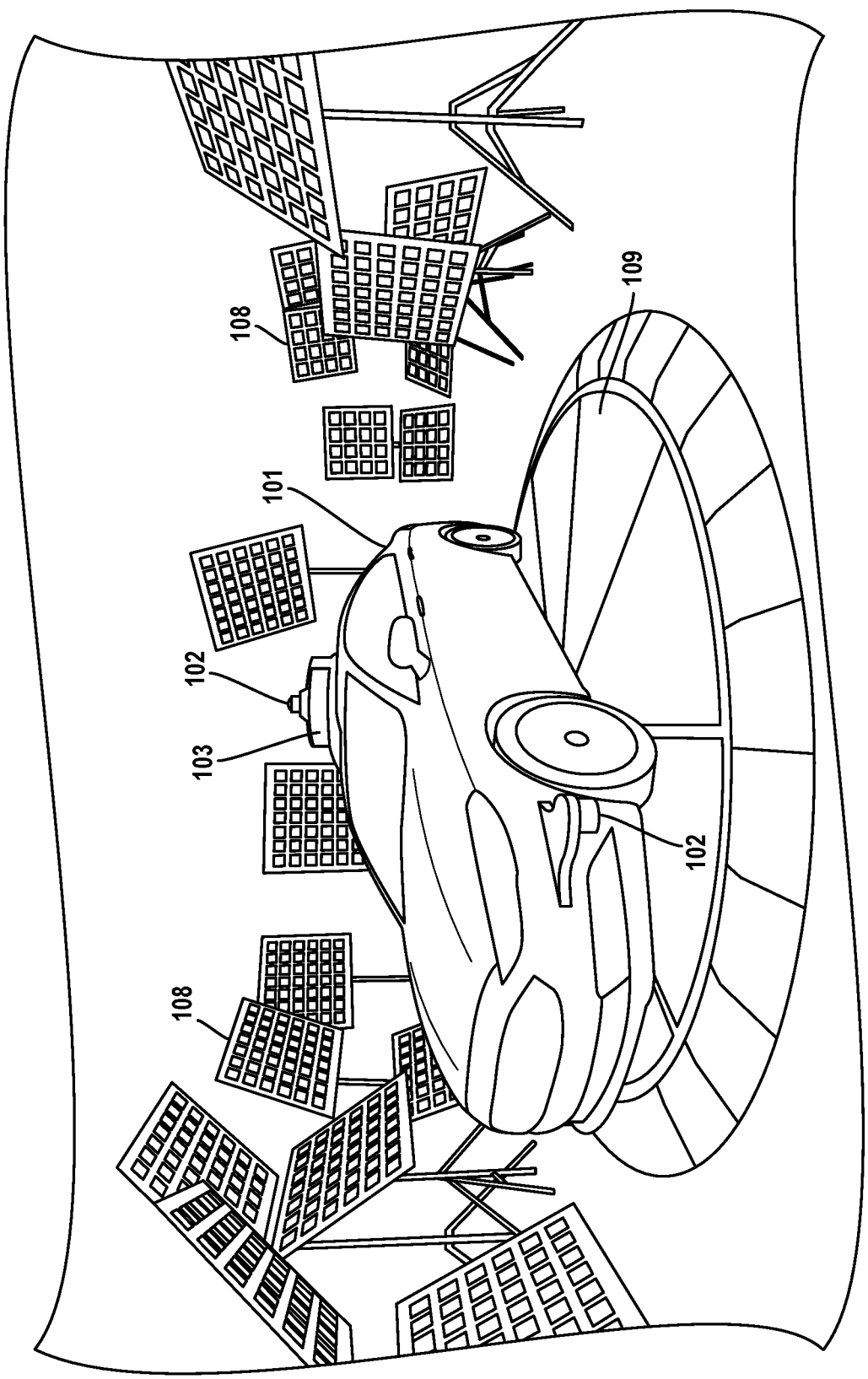
FIG. 1B is a diagram that illustrates an example of the vehicle of FIG. 1A undergoing factory calibration of sensors in a LiDAR-based sensor system.

One example of this type of calibration can be seen in FIG. 1B, which depicts the vehicle 101 of FIG. 1A undergoing a factory calibration of one or more sensors in the type of structured environment discussed above. For instance, the vehicle 101 may be surrounded by a controlled set of unobscured reference objects at various positions and orientations with respect to the vehicle 101, which are shown in FIG. 1B as a series of checkerboard targets 108. Further, the vehicle 101 may be positioned on a vehicle turntable 109 or similar equipment that is adapted to move the vehicle 101 in a controlled way. During the calibration process, each of the sensors (e.g., one or more LiDAR units 102, one or more cameras 103, etc.) of vehicle 101 may capture a relatively robust set of high-confidence sensor data that is indicative of the checkerboard targets 108 at various points in time as the vehicle 101 is rotated on the vehicle turntable 109. This sensor data may then be utilized by one or more optimization algorithms to estimate the respective pose of each sensor with respect to the vehicle's coordinate frame 107 with a relatively high degree of accuracy.

However, as a sensor-equipped vehicle operates in the real world, one or more of its sensors may become uncalibrated for various reasons, including impacts to the sensor, impacts to the vehicle, changes in temperature, among other possibilities. Some sensors may simply drift over time due to manufacturing tolerances. Accordingly, as noted above, one challenge associated with operating a sensor-equipped vehicle is the vehicle's ability to evaluate the calibration of its one or more sensors, which in some cases may involve validating that each sensor is still operating according to a previously determined calibration (e.g., a factory calibration). However, it will be appreciated that the type of controlled-environment calibration noted above can be time consuming and may be difficult to scale across a large number of vehicles.

For this reason, it would be beneficial for a vehicle to be capable of evaluating the calibration of its one or more sensors while the vehicle is operating in the real world, and potentially recalibrating the one or more sensors, if necessary. However, current approaches do not provide an efficient way to accomplish this.

In view of these and other shortcomings associated with existing approaches for calibrating sensors, disclosed herein are new techniques for evaluating the calibration of vehicle-affixed sensors based on sensor data that is captured by the sensors while the vehicle is operating in a real-world environment. In some instances, the techniques may not require vehicle motion data, and thus may be undertaken while the vehicle is stationary (e.g., at startup).

According to one possible implementation, the techniques discussed herein involve determining a calibration between two different types of sensors using a combined map that includes two layers of map data that correspond to the two different types of sensors, and which have been aligned with one another such that there is a known transformation between the coordinate frames of the two layers of map data (e.g., a LiDAR+visual map). In this regard, it should be understood that, for purposes of discussion herein, references to determining a calibration "between" two sensors may refer to determining the relative extrinsics between the two sensors, and not necessarily the extrinsics of either sensor with respect to the vehicle reference frame. Thus, determining a calibration between the two sensors may provide a basis to evaluate whether the either sensor has moved with respect to the other sensor over time (e.g., by comparing the calibration between sensors to a previous calibration between the same sensors), which in turn may provide an indication of whether one of the sensors has moved with respect to the vehicle reference frame.

As an initial matter, the generation of a combined map of this kind may present a host of challenges due to the different sensor data formats and the different coordinate frames of each individual map layer. However, techniques have been developed that involve merging the constraints of the map generation process for two different types of maps (e.g., by combining the pose graph optimization step of LiDAR map creation with the pose graph optimization step of visual map creation) in order to output two map layers of a combined map that are correlated to each other by way of a common reference frame, such that there is a known transformation between the coordinate frames of the two map layers. Such techniques are described in more detail in U.S. application Ser. No. 16/917,738, which is hereby incorporated by reference in its entirety.

Figure 2:
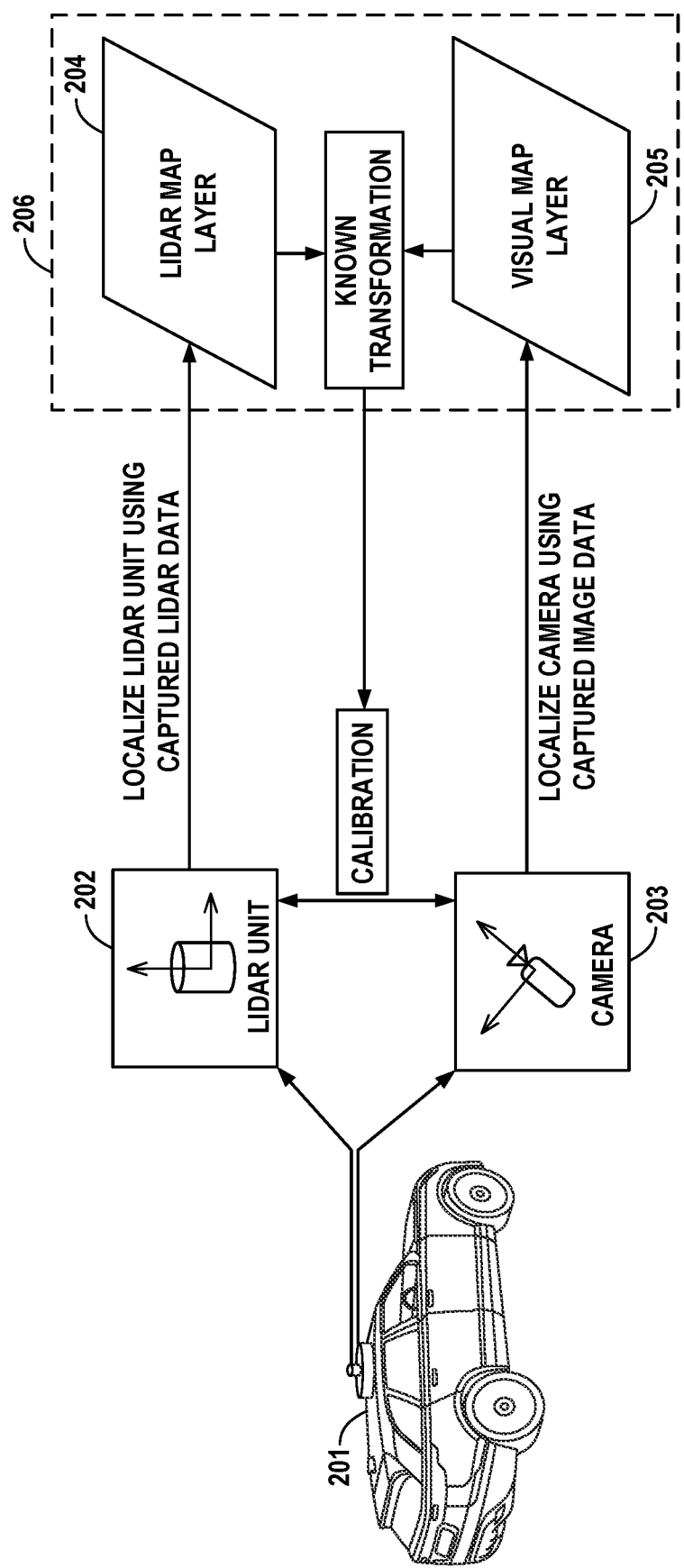
FIG. 2 is a diagram that illustrates one example of a framework that incorporates the disclosed technique of determining a calibration between two sensors.

Turning to FIG. 2, one possible example of using a combined LiDAR+visual map to determine a calibration between two different types of vehicle-affixed sensors is shown. FIG. 2 depicts a vehicle 201 that includes a LiDAR-based sensor system similar to the vehicle 101 shown in FIGS. 1A-1B, including at least one LiDAR unit 202 and at least one camera 203, among other possible sensors. At various times during operation of the vehicle 201, it may be desired to determine a calibration between the LiDAR unit 202 and the camera 203. For example, the vehicle 201 may determine a calibration between the sensors periodically (e.g., once per day, once per operational period, once per minute, once per second, etc.). Additionally or alternatively, the vehicle 201 may determine a calibration between the sensors based on the detection of an event, such as a predetermined threshold run-time being surpassed or an impact to the vehicle, among various other possibilities.

As shown in FIG. 2, the example technique for determining a calibration between the LiDAR unit 202 and the camera 203 may involve capturing sensor data with each sensor and then using the captured sensor data to localize the vehicle into the respective map layers that correspond to the two types of sensor data that were captured. For example, the LiDAR unit 202 may capture LiDAR data and then, using one or more localization techniques, the vehicle 201 may use the captured LiDAR data to localize the LiDAR unit 202 within a LiDAR map layer 204 of a combined map 206. Accordingly, the vehicle 201 may determine a pose of the LiDAR unit 202 within the coordinate frame of the LiDAR map layer 204. Similarly, the camera 203 may capture image data and then, using one or more localization techniques, the vehicle 201 may use the captured image data to localize the camera 203 within a visual map layer 205 of the combined map 206. Accordingly, the vehicle 201 may determine a pose of the camera 203 within the coordinate frame of the visual map layer 205.

Using the known transformation between the LiDAR map layer 204 and the visual map layer 205, the technique involves placing the determined poses of the LiDAR unit 202 and the camera 203 into a common coordinate frame. In some cases, the LiDAR map layer 204 and the visual map layer 205 may be generated to share a common coordinate frame, such that no additional transformation of the determined poses is necessary to place them within the same coordinate frame. Alternatively, the LiDAR map layer 204 and the visual map layer 205 may be created using the combined map generation process noted above but may nonetheless be represented according to different coordinate frames that may be aligned via a known transformation. Using the known transformation, a given pose from the LiDAR map layer's coordinate frame may be accurately placed into the visual map layer's coordinate frame, and vice versa.

Once the determined poses of the LiDAR unit 202 and the camera 203 are placed within a common coordinate frame, the vehicle 201 may determine a translation and a rotation between the two poses. These values, in turn, may represent the difference between the on-vehicle position and orientation of the LiDAR unit 202 and the camera 203. Accordingly, the extrinsics between the LiDAR unit 202 and the camera 203, and thus a calibration between the two sensors, may be determined.

Notably, the map-based calibration technique discussed above and shown in FIG. 2 may be utilized to determine a calibration between the two sensors even while the vehicle 201 is stationary, which may provide advantages over other online calibration techniques that may require the vehicle to engage in complex motion patterns before a calibration between sensors can be determined. Nonetheless, the accuracy of the map-based calibration technique described with reference to FIG. 2 may be improved by capturing sensor data and determining respective sensor poses at multiple times along the vehicle's trajectory through the real-world environment, and then aggregating those measurements together. Such an example will be discussed in further detail below.

Additional techniques for determining a calibration between two vehicle-affixed sensors based on captured sensor data while the vehicle is operating in a real-world environment are also possible, including approaches that do not rely on a previously-generated map with a known transformation between map layers. For instance, additional approaches may utilize one or more odometry techniques to estimate a first sensor's change in position over a period of time, which may be compared to a similar estimate for a second sensor over the same period of time. In this regard, odometry-based calibration between two sensors may not be limited to sensors that can be registered with corresponding map data. Rather, odometry-based calibration may be applied to any sensor modality that captures sensor data from which a trajectory may be derived. For instance, odometry-based calibration may be used to determine a calibration between a camera and an IMU.

For example, a vehicle that is in motion may utilize sensor odometry to derive a respective trajectory (e.g., a time-series of poses) over a given period of time for two different sensors. In this regard, each trajectory may be represented according to a relative coordinate frame that uses the sensor's starting point (i.e., the first pose of each trajectory) as its origin.

Once a respective trajectory is derived for each of the two different sensors, one or more optimization techniques (e.g., a least squares optimization technique) may be applied to determine a calibration between the sensors (e.g., a translation and a rotation) that aligns the two trajectories mostly closely with one another. For example, the optimization technique may be applied iteratively across the time-series of poses for each trajectory to determine adjustments until a best fit is determined. In this regard, because the on-vehicle position of any sensor relative to another sensor can be assumed to be fixed in the real world (e.g., due to each sensor's fixed position and orientation on the vehicle), the optimization is constrained such that, for each timestamp of captured sensor data, the same transformation can be assumed to exist between the respective poses of the two sensors.

Nonetheless, because determining a calibration between sensors as discussed herein may involve determining a translation and a rotation having up to six degrees of freedom, additional constraints may be necessary to increase the likelihood that the optimization technique converges to a single solution. Such constraints may be provided by the complexity of the motion path that is travelled by the vehicle, which may be reflected in the complexity of the respective trajectories that are derived for each sensor.

Numerous other possibilities exist, some examples of which will be discussed in further detail below.

Figure 3:
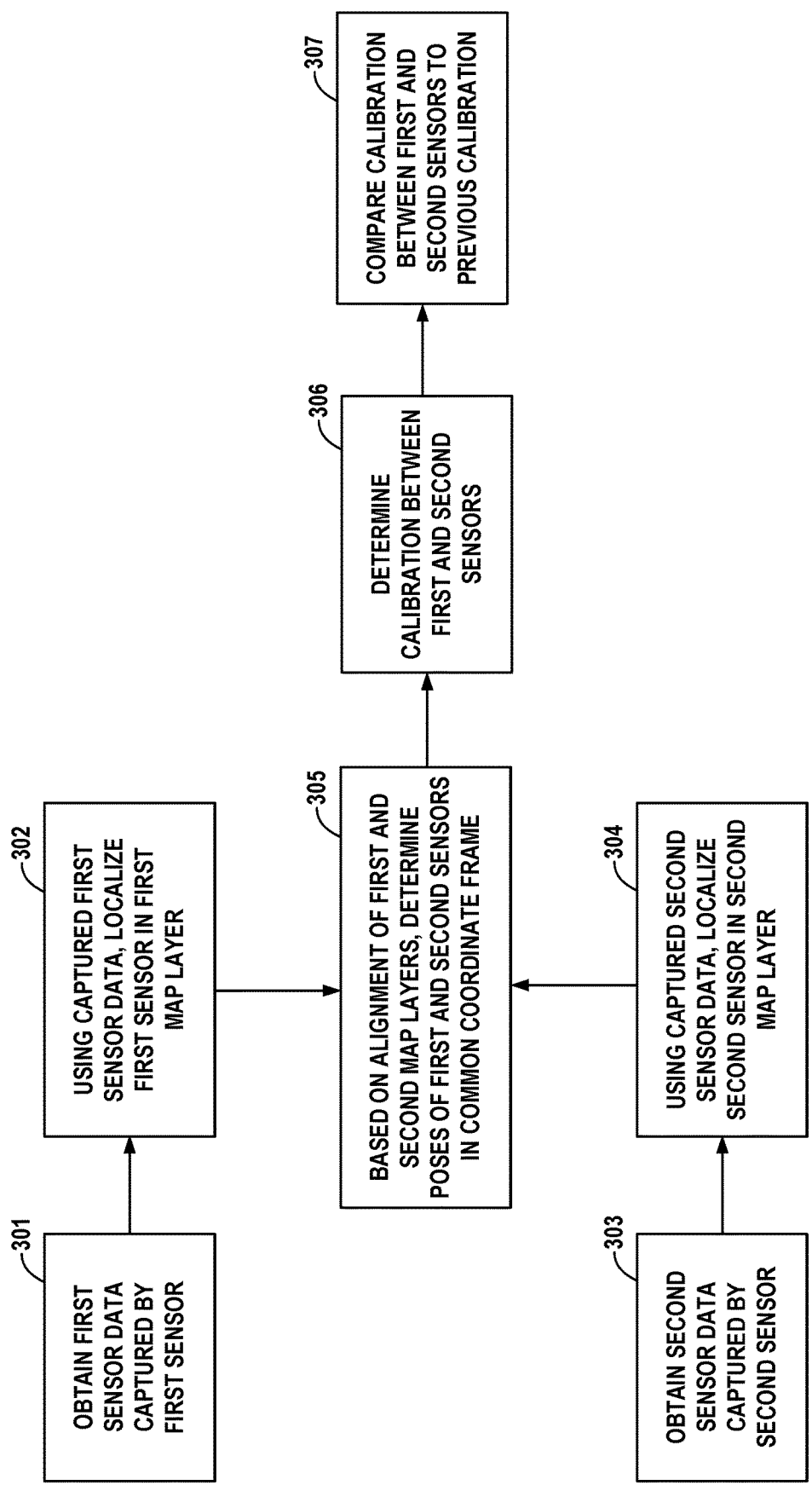
FIG. 3 is a functional block diagram that illustrates one example set of functions for determining a calibration between two sensors.

Turning now to FIG. 3, a functional block diagram is shown that illustrates an example pipeline of functions for determining a calibration between two vehicle-affixed sensors (e.g., a first sensor and a second sensor) based on sensor data captured by the sensors while the vehicle is operating in a real-world environment. In practice, this example pipeline may be implemented by any computing platform that is capable of obtaining and processing captured sensor data, such as the on-board computing system of a vehicle. One possible example of such a computing platform and the structural components thereof is described below with reference to FIG. 7.

With respect to the discussion of FIG. 3, the vehicle may be similar to the vehicle 201 shown in FIG. 2. Further, the first sensor will generally be referred to as a LiDAR unit and the second sensor will generally be referred to as a camera, consistent with the example above. However, as noted previously, various other types of sensors are possible and are also contemplated herein.

In addition to a first sensor and a second sensor, the example vehicle discussed with respect to FIG. 3 may also have access to one or more maps for the given area in which the vehicle is operating, which may be pre-loaded onto the vehicle's on-board computing system or obtained from a remote computing system, or some combination thereof. In particular, the one or more maps that are available to the vehicle for the given area may be a combined map as discussed above, generated using sensor data from at least two different types of sensors, and which includes a known alignment between the individual map layers that correspond to each type of sensor. For example, the combined map may include a first map layer (e.g., a LiDAR map layer) that includes map data corresponding to the first sensor, and a second map layer (e.g., a visual map layer) that includes map data corresponding to the second sensor.

As shown in FIG. 3 at block 301, the example pipeline involves the vehicle obtaining first sensor data captured by the first sensor. For instance, the first sensor data may be of a type that is typically captured by a LiDAR unit, such as point cloud data. At block 302, using the captured first sensor data, the vehicle may localize the first sensor within the first map layer by utilizing one or more localization techniques. As one possible example of localization using LiDAR data, the vehicle may utilize a scan-matching technique to localize the first sensor within the first map layer. This, in turn, may allow the vehicle to determine the pose of the first sensor in the first map layer's coordinate frame. In some implementations, the pose of the first sensor in the first map layer's coordinate frame may be determined as a part of the localization of the first sensor.

Similar steps may be performed with respect to the second sensor. Beginning at block 303, the example pipeline involves the vehicle obtaining second sensor data captured by the second sensor. For instance, the second sensor data may be of a type that is typically captured by a camera, such as image data. At block 304, using the captured second sensor data, the vehicle may localize the second sensor within the second map layer by utilizing one or more localization techniques. As one example of localization using image data, the vehicle may utilize a visual localization technique to localize the second sensor within the second map layer. This, in turn, may allow the vehicle to determine the pose of the second sensor in the second map coordinate layer's frame. As above, the pose of the second sensor in the second map layer's coordinate frame may be determined as a part of the localization of the second sensor.

At block 305, based on the known alignment of the first and second map layers, the vehicle may determine the respective poses of the first and second sensors in a common coordinate frame. In some implementations, as noted above, the first map layer and the second map layer may both have been generated to share the same coordinate frame, which may be a local coordinate frame of the first map layer, a local coordinate frame of the second map layer, or some other coordinate frame (e.g., a global coordinate frame). In such implementations, the poses determined for the first and second sensors within the respective map layers as part of the localization process may already be represented according to a common coordinate frame. Alternatively, the first and second map layers may be represented according to different coordinate frames that are nonetheless aligned by way of a known transformation. Thus, the known transformation may be applied to the pose for the first sensor to place it in the same coordinate frame as the pose for the second sensor, or vice versa.

Once the poses are placed in the common coordinate frame, a calibration between the two sensors may be determined based on the difference in position and orientation between the two poses. For example, the vehicle may determine a translation and a rotation between the poses of the first and second sensors, which might be expressed as respective measurements (e.g., in centimeters and degrees, using cartesian coordinates in the common coordinate frame). Accordingly, the translation and rotation may represent the on-vehicle position and orientation of the first and second sensors with respect to each other. In some examples, the translation and rotation may be further transformed into another known coordinate frame, such as the vehicle's coordinate frame.

The vehicle may perform the calibration functions shown in FIG. 3 and discussed above at various different times and/or frequencies depending on the particular application. In some embodiments, the vehicle may perform this type of calibration between sensors at startup, each time the vehicle is powered on for operation. Advantageously, the functions discussed above do not require any motion on the part of the vehicle (e.g., they do not require vehicle trajectories), and thus may be undertaken before the vehicle begins to move. Further, the calibration between sensors may be checked at various times during operation, while the vehicle is stationary or moving, based on either a predetermined schedule or the detection of events that might be likely to affect calibration (e.g., vehicle impacts), or some combination thereof.

In other embodiments, the calibration between sensors may be checked far more often, up to and including at sensor frequency. For instance, the vehicle may be capable of localizing a given sensor (e.g., a camera) within its respective map layer based on a single frame of sensor data (e.g., a single image) captured by the sensor. Thus, the vehicle may perform some or all of the functions shown in FIG. 3 for every frame of captured sensor data, and therefore might publish a determined calibration between the sensors for every frame. In other implementations, the vehicle may perform localization on each captured frame of sensor data from both sensors and determine a calibration between the two, but may aggregate the determined calibration values over some period of frames (e.g., ten frames, one hundred frames, etc.) before publishing an aggregated calibration. In this regard, an aggregated calibration between the sensors may have an associated confidence level that reflects the consistency of the determined calibration values over the period of frames. For example, if the vehicle determines the same calibration between the sensors (e.g., the same translation and rotation) for ten consecutive frames, the aggregated calibration for that period of frames may have a relatively high confidence. Thus, performing calibrations at sensor frequency but publishing a determined calibration between the sensors less frequently may increase the confidence in such determined calibrations.

The calibration functions noted above may be performed at other times and at other frequencies as well.

The vehicle may utilize the determined calibration between the sensors obtained from the functions discussed above in various ways. As one possibility, the vehicle may compare the determined calibration between the sensors with one or more previously determined calibrations, as shown at block 307 in FIG. 3. For instance, the previous calibration may be a factory calibration that represents an "original" calibration between the sensors, or some other known calibration that is stored in the vehicle's memory as a representation of the vehicle's "current" calibration between the sensors. As another possibility, the previous calibration(s) may be one or more of the most recently published calibrations. Other possibilities for comparing the determined calibration between the sensors to previous calibrations also exist.

Based on the comparison, the vehicle may determine that the calibration between the two sensors has changed compared to the previous calibration. As one example, an impact to the vehicle might cause one of the cameras to shift position and/or orientation. Accordingly, a comparison of the calibration between the camera and the vehicle's LiDAR unit to a previous calibration of those two sensors would reflect that they have become uncalibrated with respect to each other. This, in turn, may provide an indication that one of the two sensors has become uncalibrated with respect to the vehicle's reference frame. In some cases, if a change in calibration is relatively large, the vehicle may trigger a notification to take some action to correct the calibration. For example, if the change in calibration is detected during operation while the vehicle is moving, the vehicle might notify the driver to pull over. Similarly, if the vehicle is an autonomous or semi-autonomous vehicle, it may develop a driving plan that involves pulling over and perhaps further assessing the calibration.

In this example, where the camera has shifted in position and/or orientation, the vehicle may determine that the camera—and not the LiDAR unit—is the sensor that has become uncalibrated in various ways. For instance, the vehicle may undertake the calibration discussed herein between each pair of sensors on the vehicle. Thus, if the vehicle determines that a LiDAR unit and a first camera have become uncalibrated, but the same LiDAR unit has separately maintained a consistent calibration with both a second and a third camera, the vehicle may determine that the first camera is the cause of the change in calibration between it and the LiDAR unit.

As another example of determining a change in the calibration between two sensors, the comparison of the determined calibration to a previous calibration at block 307 may indicate that the calibration between two sensors has changed, but by a relatively small amount that may not significantly affect the vehicle's operation. Thus, the vehicle may determine that pulling over to take an action related to the calibration issue is not necessary, for instance. Rather, in some implementations, the vehicle may incorporate the detected change into its existing calibration estimation for the vehicle. For example, the vehicle may determine which of the two sensors has cause the change in calibration between the sensors, as discussed above, and then update its current calibration to reflect the change in position or orientation of the changed sensor. This, in turn, may result in better performance of downstream services that utilize the captured sensor data, which might otherwise reflect minor inaccuracies if the change in sensor calibration is not incorporated.

The vehicle may respond to detected changes in the calibration between sensors in various other ways as well.

As yet another possible use case for the calibration information discussed above, the vehicle may store the calibration between the two sensors that is determined at block 306 in association with the captured sensor data that was used to determine the calibration. This may allow the calibration data to be incorporated into other downstream tasks as appropriate, such as using the captured sensor data for generating maps, evaluating perception performance, analyzing human driving behavior, or training machine learning models to be used by an on-board computing system, among other possibilities.

Figure 4A:
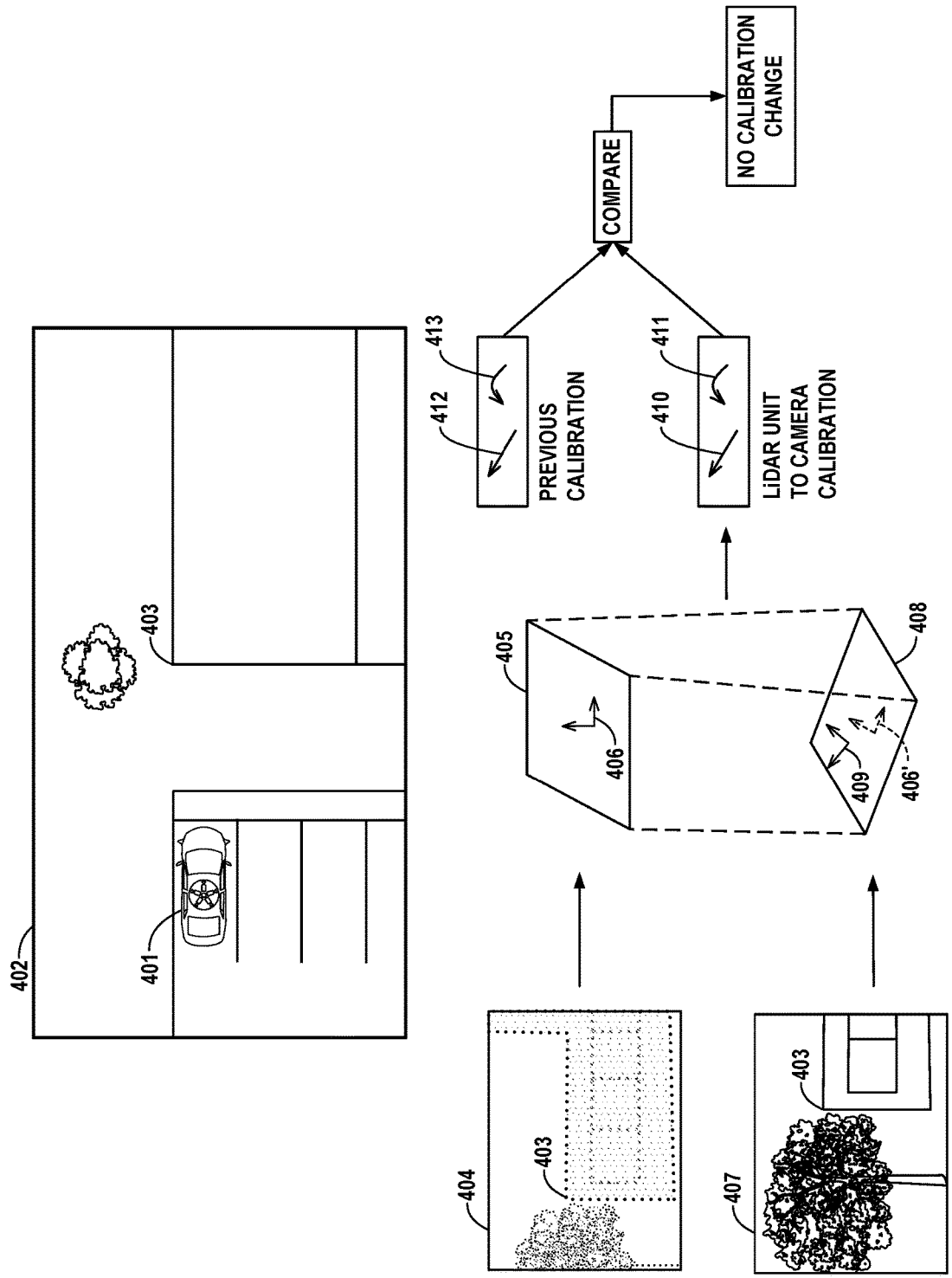
FIG. 4A is a diagram that illustrates one example of a stationary vehicle using captured sensor data and map data to determine a calibration between two sensors.
Figure 4C:
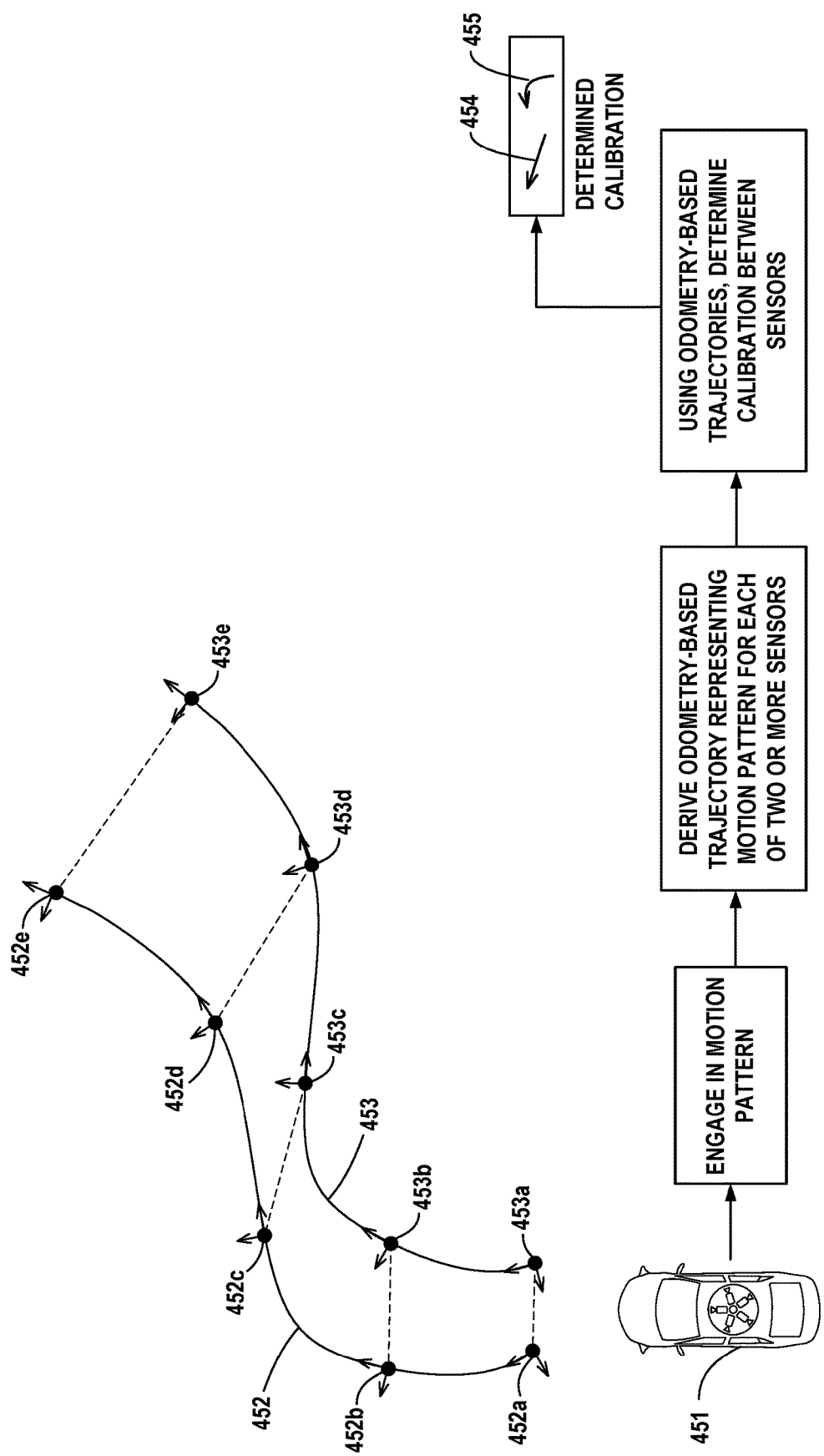
FIG. 4C is a diagram that illustrates one example of a vehicle using odometry to determine a calibration between two sensors.

Several examples of utilizing the techniques discussed above for determining a calibration between sensors while a vehicle is operating in a real-world environment are illustrated in FIGS. 4A-4C. Beginning with FIG. 4A, a vehicle 401 is shown in a given area 402. The vehicle 401 may be similar to the vehicle 201 shown in FIG. 2, for instance, and may include one or more LiDAR sensors and one or more cameras, among other possible sensors. As shown in FIG. 4A, the vehicle 401 is parked in a parking lot and may be assumed to be stationary.

The vehicle 401 may also have access to a combined map that includes map data for the given area 402. In this regard, the combined map may include various individual map layers that include information for the given area 402 that is generated from the different types of sensor data that may be captured by the vehicle 401. For example, the combined map may include a LiDAR map layer that includes information for the given area 402 that is generated from captured LiDAR data. Accordingly, the LiDAR map layer of the given area 402 may include point cloud data representing the building 403, the tree adjacent to the building, the parking lot in which the vehicle 401 is parked, among other information. Similarly, the combined map may include a visual map layer that includes information for the given area 402 that is generated from captured image data. Accordingly, the visual map layer of the given area 402 may include image data representing the building 403, the tree, and the parking lot, among other information. Further, although the individual map layers of the combined map are each represented according to a different coordinate frame in the example of FIG. 4A, the map layers may nonetheless be aligned according to a known transformation between their respective coordinate frames.

As shown in FIG. 4A, the vehicle 401 may obtain sensor data captured by its LiDAR unit, which is represented by the frame of LiDAR data 404 for purposes of illustration. Using the captured LiDAR data, the vehicle 401 localize the LiDAR unit within the LiDAR map layer for the given area. For example, based on a detected location of various objects within the frame of LiDAR data 404, such as the building 403, the vehicle 401 may apply a localization technique such as scan-matching to localize the LiDAR unit in the LiDAR map layer. Accordingly, a position and orientation for the LiDAR unit, represented in FIG. 4A by the pose 406, may be determined within the coordinate frame 405 of the LiDAR map layer.

The vehicle 401 may undertake similar steps with respect to one of its affixed cameras. In particular, the vehicle 401 may obtain image data captured by its camera, which is represented by the frame of image data 407 in FIG. 4A. Comparing the frame of image data 407 to the frame of LiDAR data 404, it can be seen that the two sensors capture the same information for the given area 402, but in different formats and from different capture points based on the different on-vehicle position and orientation of each sensor on the vehicle 401. Using the captured image data, the vehicle 401 may localize the camera within the visual map layer for the given area 402. For example, based on a detected location of various objects within the frame of image data 407, such as the building 403, the vehicle 401 may apply a localization technique such as image-based localization to localize the camera in the visual map layer. Accordingly, a position and orientation for the camera, represented in FIG. 4A by the pose 409, may be determined within the visual map layer's coordinate frame 408.

As noted above, the individual LiDAR and visual map layers of the combined map available to the vehicle 401 are not represented according to a common coordinate frame. This is illustrated in FIG. 4A by the dissimilar orientations of the LiDAR map layer's coordinate frame 405 and the visual map layer's coordinate frame 408. However, the coordinate frames of the two map layers may be aligned according to a known transformation, which is illustrated by the dashed lines connecting the coordinate frames in FIG. 4A. Accordingly, the vehicle 401 may accurately position the pose from one coordinate frame into the other according to the known transformation. As shown in FIG. 4A, the vehicle 401 has placed the pose 406 of the LiDAR unit from the LiDAR map layer's coordinate frame 405 into the visual map layer's coordinate frame 408, as shown by the pose 406'.

The vehicle 401 may then determine a calibration between the LiDAR unit and the camera by determining a translation 410 and rotation 411 between the pose 409 of the camera and the pose 406' of the LiDAR unit. As shown in FIG. 4A, the calibration is expressed as a translation 410 and rotation 411 of the LiDAR unit to the camera, representing the difference between the on-vehicle position and orientation of the LiDAR unit and camera on the vehicle 401. The vehicle 401 may then compare this calibration to a previously determined calibration between the LiDAR unit and the camera, which may be stored in memory of vehicle's on-board computing system and may include a translation 412 and a rotation 413. In the example of FIG. 4A, the vehicle 401 may determine no change between the newly-determined calibration between the LiDAR unit and the camera and the previous calibration.

Turning to FIG. 4B, another example of determining a calibration between sensors while a vehicle is operating in a real-world environment is illustrated, including a vehicle 421 driving in a given area 422. The vehicle 421 may be similar to the vehicle 401 shown in FIG. 4A, and may include one or more LiDAR units and one or more cameras, among other possible sensors.

Also similar to the example of FIG. 4A, the vehicle 421 may have access to a combined map that includes map data for the given area 422, including various individual map layers that include information for the given area 422 that is generated from the different types of sensor data that may be captured by the vehicle 421. Accordingly, a LiDAR map layer may include point cloud data representing the traffic signal 423 and the road network, among other objects. As above, the combined map may also include a visual map layer that includes information for the given area 422 that is generated from captured image data. Accordingly, the visual map layer may include image data representing the traffic signal 423, the road network, and other information.

The vehicle 421 may obtain sensor data captured by its LiDAR unit. However, whereas the example of FIG. 4A involved a single frame of sensor data, the vehicle 421 may determine a calibration between the sensors based on a series of sensor frames, which are illustrated by the stack of LiDAR data frames 424 in FIG. 4B.

Using the captured LiDAR data, the vehicle 421 may localize the LiDAR unit—for each frame of LiDAR data 424 in the series—within the LiDAR map layer for the given area 422. For example, based on a detected location of various objects within each frame of the LiDAR data 424, such as the traffic signal 423, the vehicle 421 may apply a localization technique such as scan-matching to localize the LiDAR unit in the LiDAR map layer. Accordingly, a position and orientation for the LiDAR unit may be determined, for each frame of LiDAR data 424, within the coordinate frame 425 of the LiDAR map layer. This is illustrated in FIG. 4B by the pose 426, which may be one of a series of poses that are determined for the LiDAR unit.

Likewise, the vehicle 421 may obtain image data captured by its camera as a series of image frames 427, as shown in FIG. 4B. Using the captured image data 427, the vehicle 421 may localize the camera—for each frame of image data 427 in the series—within the visual map layer for the given area 422. As noted above, vehicle 421 may apply an image-based localization technique to localize the camera in the visual map layer. Accordingly, a position and orientation for the camera may be determined, for each frame of image data 427, within the coordinate frame 428 of the visual map layer. This is represented in FIG. 4B by the pose 429, which may be one of a series of poses that are determined for the camera.

Unlike the example of FIG. 4A, the individual LiDAR and visual map layers available to vehicle 421 are each represented according to a common coordinate frame. This is illustrated in the example of FIG. 4B by the identical orientation of the LiDAR map layer's coordinate frame 425 and the visual map layer's coordinate frame 428 and the dashed lines connecting them. Thus, the vehicle 421 may directly compare the poses of the LiDAR unit and the camera.

Accordingly, vehicle 421 may determine a calibration between the LiDAR unit and the camera by determining a translation and a rotation between each respective pose 429 of the camera and pose 426 of the LiDAR unit, which in turn may represent the difference between the on-vehicle position and orientation of the LiDAR unit and camera on the vehicle 421. In this regard, the vehicle 421 may determine a series of calibrations corresponding to each captured pair of LiDAR data and visual data frames. The series of calibrations between the sensors may be aggregated over a period of time, or over a predetermined number of frames, in order to determine an aggregated calibration. As above, the aggregated calibration determined by the vehicle 421 may be represented as a translation 430 and a rotation 431, and the vehicle 421 may compare these values to a previously determined calibration between the LiDAR unit and the camera, which may include a translation 432 and a rotation 433.

In the example of FIG. 4B, the vehicle 421 may determine a change between the newly-determined, aggregated calibration between the sensors and the previous calibration. For example, the change in the calibration between the LiDAR unit and the camera may be represented by a difference between the translation 430 and the translation 432. Accordingly, the vehicle 421 may determine one or more actions that may be taken based on the detected calibration change. As one example, the vehicle 421 may determine that the magnitude of the change is below a threshold value, such that the change in calibration may be incorporated into the vehicle's existing calibration. Thus, the vehicle 421 may update its calibration, as shown in FIG. 4B. Advantageously, the vehicle 421 may update its calibration in this way during operation, as sensor data is captured and as the change in calibration between the sensors is detected.

Various other examples of determining a calibration between two sensors base on available map data are also possible.

Turning to FIG. 4C, another example of determining a calibration between sensors while a vehicle is operating in the real world is shown that uses odometry-based calibration. In this regard, the odometry-based technique illustrated in FIG. 4C may not require pre-generated map data for the vehicle's surrounding environment, and thus may be utilized when a combined map of the type discussed above is not available. Further, because corresponding map data is not required, other sensor modalities may be considered for calibration.

According to the odometry-based calibration technique, a vehicle 451 may engage in a motion pattern that is generally shown by a first trajectory 452 and a second trajectory 453. In this regard, the first trajectory 452 may represent a trajectory that is derived based on sensor data captured by a first sensor of the vehicle 451, such as a LiDAR unit or camera. The first trajectory 452 is comprised of a series of poses 452*a*, 452*b*, 452*c*, 452*d*, and 452*e* that may represent individual frames of sensor data captured by the first sensor at a series of times during a given period of operation for the vehicle. Further, the first trajectory 452 may be represented within a local coordinate frame for the first sensor that uses the first pose 452*a*, captured at a first timestamp, as an arbitrarily designated origin point.

Similarly, the second trajectory 453 may represent a trajectory that is derived based on sensor data captured by a second sensor of the vehicle 451, such as an IMU. For example, the IMU may capture sensor data indicating the acceleration and rotational velocity of the IMU during the same period of operation for the vehicle. This sensor data may be differentiated to determine relative positions and orientations (i.e., poses) of the IMU at each timestamp, which may be used to derive the odometry-based second trajectory 453 shown in FIG. 4B. Accordingly, the second trajectory 453 is comprised of a series of poses 453*a*, 453*b*, 453*c*, 453*d*, and 453*e* that correspond in time to the poses of the first trajectory 452. However, like the first trajectory 452, the second trajectory 453 may be represented within a local coordinate frame for the IMU. Thus, the poses between the two trajectories are not represented in the same coordinate frame and cannot be readily compared.

However, the odometry-based trajectories 452 and 453 shown in FIG. 4C nonetheless possess substantially the same shape. Thus, one or more optimization techniques (e.g., a least squares optimization technique, among other possibilities) may be used to determine a transformation between the two trajectories. Further because the two odometry-based trajectories shown in FIG. 4C were derived from sensors that are assumed to be fixed in the real world relative to each other (e.g., due to each sensor's fixed position and orientation on the vehicle), the optimization is constrained such that, for each timestamp of captured sensor data, the same transformation can be assumed to exist between the respective poses of the two sensors. This correspondence is illustrated in FIG. 4C by the dashed line connecting each pair of poses between the two trajectories.

The optimization technique may take various forms. As one possibility, a first, approximate calibration (e.g., a translation and rotation) between the two sensors may be assumed, which may be applied to each respective pair of poses. Based on the resulting error in alignment that results, the calibration may then be refined in an iterative fashion until the overall error between the alignment of the two trajectories is minimized, among other possible optimization techniques. The transformation that results from the optimization may be expressed as a translation 454 and a rotation 455 (e.g., within a six-axis coordinate system), as shown in FIG. 4C. Consistent with the examples above, the translation 454 and the rotation 455 may represent the calibration between the first and second sensors.

As noted above, determining a calibration to align trajectories 452 and 453 within a coordinate frame having up to six degrees of freedom may require sufficient constraints to allow the optimization techniques to determine a single solution. In this regard, many of the necessary constraints may be introduced by the complexity of the vehicle's motion pattern. For instance, a motion pattern that includes one or more curves may introduce sensor data for multiple translational and rotational directions that must be considered during the optimization. On the other hand, a vehicle motion pattern that is simply a straight line in a single translational direction may not require the optimization to consider any variables in other translational or rotational directions. Thus, to the extent that differences in the calibration between the two sensors exist in these other translational or rotational directions, they may not be captured by the optimization. Accordingly, calibration using the odometry-based approach discussed above and shown in FIG. 4C may benefit from vehicle movement that is sufficiently complex such that it excites motion in multiple translational and rotational directions.

Other types of sensors in addition to those discussed above may also be calibrated using an odometry-based approach. For example, a RADAR unit and/or a SONAR unit may each capture sensor data from which an odometry-based trajectory can be derived. Thus, a time-series of poses for the RADAR unit and/or the SONAR unit may be aligned to other sensor trajectories as discussed above. Further, the example odometry-based calibration shown in FIG. 4C is also not limited to sensors of different modalities. In some implementations, this approach may be used to determine a calibration between two cameras, or two LiDAR units, among other possibilities.

Although the odometry-based approach discussed above has been presented as an alternative to the map-based approaches shown in FIGS. 4A-4B, it will be appreciated that the two approaches may also be used together to provide a more robust estimation of the calibration between sensors. In some cases, using the two approaches in conjunction may provide additional benefits. As one example, vehicle trajectories that are derived using odometry may be accurate locally, but relatively small errors in each determined pose may accumulate over time such that the error eventually becomes relatively large. To compensate for such accumulated errors in the odometry-based approach, a given sensor may also be localized within a corresponding map for the vehicle's surrounding environment, as discussed above, which may bound the error associated with each pose such that it is substantially the same for each frame. In this way, the accuracy of the trajectories that are derived using the odometry-based approach may be improved.

Numerous other examples for determining a calibration between two different types of vehicle-affixed sensors based on sensor data captured by the sensors while the vehicle is operating in a real-world environment are also possible, including various different combinations of the techniques and approaches discussed above.

As noted, the sensor calibration techniques discussed above may be used to improve the safe and efficient operation of a sensor-equipped vehicle. One possible example of such a vehicle will now be discussed in greater detail.

Figure 5:
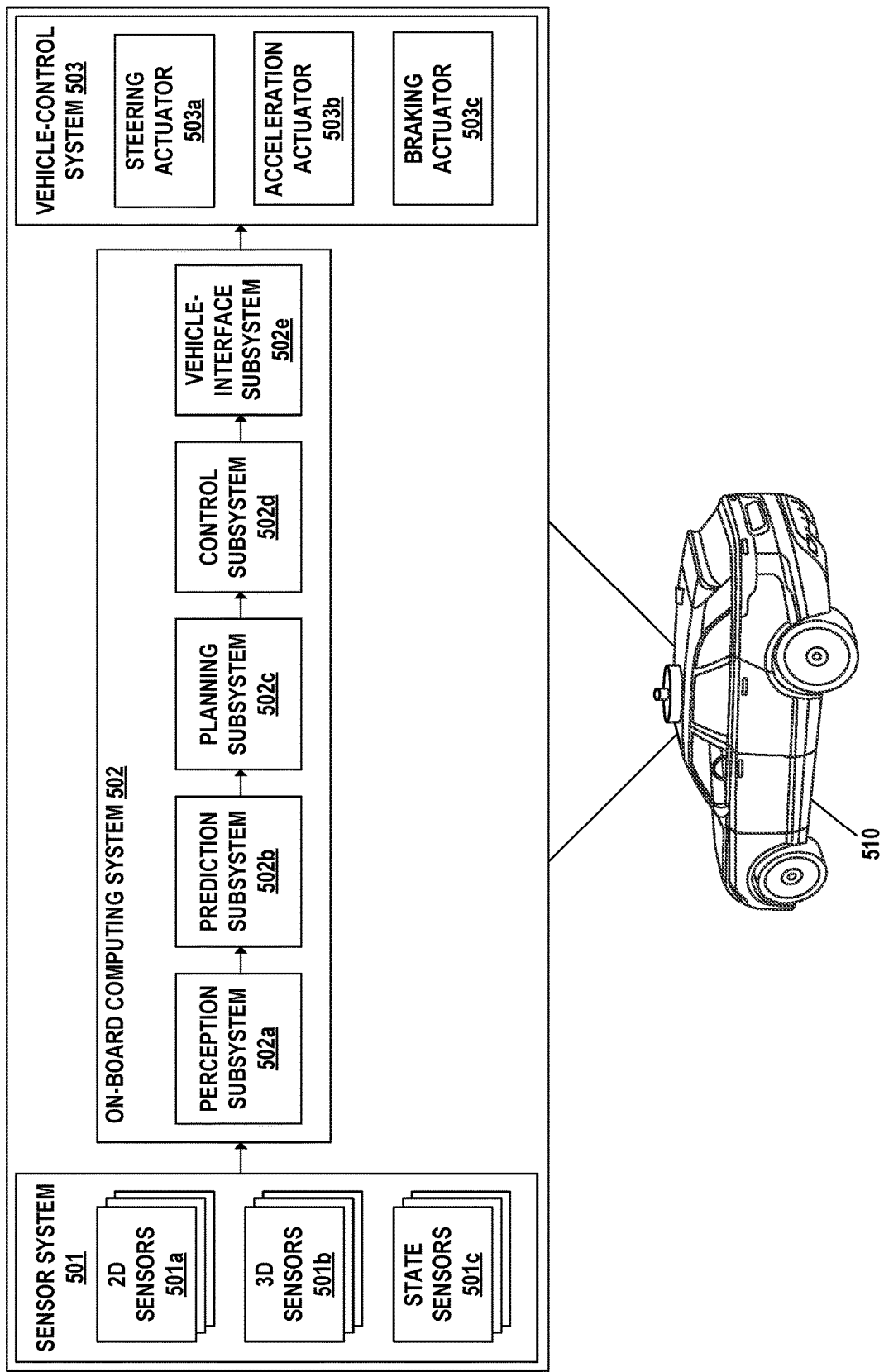
FIG. 5 is a simplified block diagram that illustrates certain systems that may be included in an example vehicle.

Turning to FIG. 5, a simplified block diagram is provided to illustrate certain systems that may be included in an example vehicle 500. As shown, at a high level, vehicle 500 may include at least (i) a sensor system 501 that is configured to capture sensor data that is representative of the real-world environment being perceived by the vehicle (i.e., the collection vehicle's "surrounding environment") and/or the collection vehicle's operation within that real-world environment, (ii) an on-board computing system 502 that is configured to perform functions related to autonomous operation of vehicle 500 (and perhaps other functions as well), and (iii) a vehicle-control system 503 that is configured to control the physical operation of vehicle 500, among other possibilities. Each of these systems may take various forms.

In general, sensor system 501 may comprise any of various different types of sensors, each of which is generally configured to detect one or more particular stimuli based on vehicle 500 operating in a real-world environment. The sensors then output sensor data that is indicative of one or more measured values of the one or more stimuli at one or more capture times (which may each comprise a single instant of time or a range of times).

For instance, as one possibility, sensor system 501 may include one or more 2D sensors 501*a* that are each configured to capture 2D sensor data that is representative of the vehicle's surrounding environment. Examples of 2D sensor(s) 501*a* may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 501*a* may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 501 may include one or more 3D sensors 501*b* that are each configured to capture 3D sensor data that is representative of the vehicle's surrounding environment. Examples of 3D sensor(s) 501*b* may include a LiDAR unit, a 3D RADAR unit, a 3D SONAR unit, a 3D ultrasound unit, and a camera array equipped for stereo vision, among other possibilities. Further, in an example implementation, 3D sensor(s) 501b may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 501 may include one or more state sensors 501c that are each configured capture sensor data that is indicative of aspects of the vehicle's current state, such as the vehicle's current position, current orientation (e.g., heading/yaw, pitch, and/or roll), current velocity, and/or current acceleration of vehicle 500. Examples of state sensor(s) 501c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 501 may include various other types of sensors as well.

In turn, on-board computing system 502 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 502 may take the form of any one or more interfaces that facilitate communication with other systems of vehicle 500 (e.g., sensor system 501, vehicle-control system 503, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 502 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 502 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 502 such that on-board computing system 502 is configured to perform various functions related to the autonomous operation of vehicle 500 (among other possible functions), and (ii) data that may be obtained, derived, or otherwise stored by on-board computing system 502.

In one embodiment, on-board computing system 502 may also be functionally configured into a number of different subsystems that are each tasked with performing a specific subset of functions that facilitate the autonomous operation of vehicle 500, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 502.

As shown in FIG. 5, in one embodiment, the functional subsystems of on-board computing system 502 may include (i) a perception subsystem 502a that generally functions to derive a representation of the surrounding environment being perceived by vehicle 500, (ii) a prediction subsystem 502b that generally functions to predict the future state of each object detected in the vehicle's surrounding environment, (iii) a planning subsystem 502c that generally functions to derive a behavior plan for vehicle 500, (iv) a control subsystem 502d that generally functions to transform the behavior plan for vehicle 500 into control signals for causing vehicle 500 to execute the behavior plan, and (v) a vehicle-interface subsystem 502e that generally functions to translate the control signals into a format that vehicle-control system 503 can interpret and execute. However, it should be understood that the functional subsystems of on-board computing system 502 may take various other forms as well. Each of these example subsystems will now be described in further detail below.

For instance, the subsystems of on-board computing system 502 may begin with perception subsystem 502a, which may be configured to fuse together various different types of "raw" data that relate to the vehicle's perception of its surrounding environment and thereby derive a representation of the surrounding environment being perceived by vehicle 500. In this respect, the "raw" data that is used by perception subsystem 502a to derive the representation of the vehicle's surrounding environment may take any of various forms.

For instance, at a minimum, the "raw" data that is used by perception subsystem 502a may include multiple different types of sensor data captured by sensor system 501, such as 2D sensor data (e.g., image data) that provides a 2D representation of the vehicle's surrounding environment, 3D sensor data (e.g., LiDAR data) that provides a 3D representation of the vehicle's surrounding environment, and/or state data for vehicle 500 that indicates the past and current position, orientation, velocity, and acceleration of vehicle 500. Additionally, the "raw" data that is used by perception subsystem 502a may include map data associated with the vehicle's location, such as high-definition geometric and/or semantic map data, which may be preloaded onto on-board computing system 502 and/or obtained from a remote computing system. Additionally yet, the "raw" data that is used by perception subsystem 502a may include navigation data for vehicle 500 that indicates a specified origin and/or specified destination for vehicle 500, which may be obtained from a remote computing system (e.g., a transportation-matching system) and/or input by a human riding in vehicle 500 via a user-interface component that is communicatively coupled to on-board computing system 502. Additionally still, the "raw" data that is used by perception subsystem 502a may include other types of data that may provide context for the vehicle's perception of its surrounding environment, such as weather data and/or traffic data, which may be obtained from a remote computing system. The "raw" data that is used by perception subsystem 502a may include other types of data as well.

Advantageously, by fusing together multiple different types of raw data (e.g., both 2D sensor data and 3D sensor data), perception subsystem 502a is able to leverage the relative strengths of these different types of raw data in a way that may produce a more accurate and precise representation of the surrounding environment being perceived by vehicle 500.

Further, the function of deriving the representation of the surrounding environment perceived by vehicle 500 using the raw data may include various aspects. For instance, one aspect of deriving the representation of the surrounding environment perceived by vehicle 500 using the raw data may involve determining a current state of vehicle 500 itself, such as a current position, a current orientation, a current velocity, and/or a current acceleration, among other possibilities. In this respect, perception subsystem 502a may also employ a localization technique such as SLAM to assist in the determination of the vehicle's current position and/or orientation. (Alternatively, it is possible that on-board computing system 502 may run a separate localization service that determines position and/or orientation values for vehicle 500 based on raw data, in which case these position and/or orientation values may serve as another input to perception sub system 502a).

Another aspect of deriving the representation of the surrounding environment perceived by vehicle 500 using the raw data may involve detecting objects within the vehicle's surrounding environment, which may result in the determination of class labels, bounding boxes, or the like for each detected object. In this respect, the particular classes of objects that are detected by perception subsystem 502a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 502a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 500 using the raw data may involve determining a current state of each object detected in the vehicle's surrounding environment, such as a current position (which could be reflected in terms of coordinates and/or in terms of a distance and direction from vehicle 500), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 500, among other possibilities.

The function of deriving the representation of the surrounding environment perceived by vehicle 500 using the raw data may include other aspects as well.

Further yet, the derived representation of the surrounding environment perceived by vehicle 500 may incorporate various different information about the surrounding environment perceived by vehicle 500, examples of which may include (i) a respective set of information for each object detected in the vehicle's surrounding, such as a class label, a bounding box, and/or state information for each detected object, (ii) a set of information for vehicle 500 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 500 may incorporate other types of information about the surrounding environment perceived by vehicle 500 as well.

Still further, the derived representation of the surrounding environment perceived by vehicle 500 may be embodied in various forms. For instance, as one possibility, the derived representation of the surrounding environment perceived by vehicle 500 may be embodied in the form of a data structure that represents the surrounding environment perceived by vehicle 500, which may comprise respective data arrays (e.g., vectors) that contain information about the objects detected in the surrounding environment perceived by vehicle 500, a data array that contains information about vehicle 500, and/or one or more data arrays that contain other semantic information about the surrounding environment. Such a data structure may be referred to as a "parameter-based encoding."

As another possibility, the derived representation of the surrounding environment perceived by vehicle 500 may be embodied in the form of a rasterized image that represents the surrounding environment perceived by vehicle 500 in the form of colored pixels. In this respect, the rasterized image may represent the surrounding environment perceived by vehicle 500 from various different visual perspectives, examples of which may include a "top down" view and a "bird's eye" view of the surrounding environment, among other possibilities. Further, in the rasterized image, the objects detected in the surrounding environment of vehicle 500 (and perhaps vehicle 500 itself) could be shown as color-coded bitmasks and/or bounding boxes, among other possibilities.

The derived representation of the surrounding environment perceived by vehicle 500 may be embodied in other forms as well.

As shown, perception subsystem 502a may pass its derived representation of the vehicle's surrounding environment to prediction subsystem 502b. In turn, prediction subsystem 502b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 500 to anticipate how the real-world objects in its surrounding environment are likely to behave in the future and then plan its behavior in a way that accounts for this future behavior.

Prediction subsystem 502b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 502b is configured to predict this type of future state information for a detected object at multiple future times, such a time sequence of future states may collectively define a predicted future trajectory of the detected object. Further, in some embodiments, prediction subsystem 502b could be configured to predict multiple different possibilities of future states for a detected object (e.g., by predicting the 3 most-likely future trajectories of the detected object). Prediction subsystem 502b may be configured to predict other aspects of a detected object's future behavior as well.

In practice, prediction subsystem 502b may predict a future state of an object detected in the vehicle's surrounding environment in various manners, which may depend in part on the type of detected object. For instance, as one possibility, prediction subsystem 502b may predict the future state of a detected object using a data science model that is configured to (i) receive input data that includes one or more derived representations output by perception subsystem 502a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 502, although it is possible that a future-state model could be created by on-board computing system 502 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 502b could predict the future state of a detected object in other manners as well. For instance, for detected objects that have been classified by perception subsystem 502a as belonging to certain classes of static objects (e.g., roads, curbs, lane markings, etc.), which generally do not have the potential to move, prediction subsystem 502b may rely on this classification as a basis for predicting that the future state of the detected object will remain the same at each of the one or more future times (in which case the state-prediction model may not be used for such detected objects). However, it should be understood that detected objects may be classified by perception subsystem 502a as belonging to other classes of static objects that have the potential to change state despite not having the potential to move, in which case prediction subsystem 502b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 500.

After predicting the future state of each object detected in the surrounding environment perceived by vehicle 500 at one or more future times, prediction subsystem 502b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 502b may pass the one or more derived representations of the vehicle's surrounding environment to planning subsystem 502c. In turn, planning subsystem 502c may be configured to use the one or more derived representations of the vehicle's surrounding environment (and perhaps other data) to derive a behavior plan for vehicle 500, which defines the desired driving behavior of vehicle 500 for some future period of time (e.g., the next 5 seconds).

The behavior plan that is derived for vehicle 500 may take various forms. For instance, as one possibility, the derived behavior plan for vehicle 500 may comprise a planned trajectory for vehicle 500 that specifies a planned state of vehicle 500 at each of one or more future times (e.g., each second over the next 5 seconds), where the planned state for each future time may include a planned position of vehicle 500 at the future time, a planned orientation of vehicle 500 at the future time, a planned velocity of vehicle 500 at the future time, and/or a planned acceleration of vehicle 500 (whether positive or negative) at the future time, among other possible types of state information. As another possibility, the derived behavior plan for vehicle 500 may comprise one or more planned actions that are to be performed by vehicle 500 during the future window of time, where each planned action is defined in terms of the type of action to be performed by vehicle 500 and a time and/or location at which vehicle 500 is to perform the action, among other possibilities. The derived behavior plan for vehicle 500 may define other planned aspects of the vehicle's behavior as well.

Further, in practice, planning subsystem 502c may derive the behavior plan for vehicle 500 in various manners. For instance, as one possibility, planning subsystem 502c may be configured to derive the behavior plan for vehicle 500 by (i) deriving a plurality of different "candidate" behavior plans for vehicle 500 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 500. Planning subsystem 502c may derive the behavior plan for vehicle 500 in various other manners as well.

After deriving the behavior plan for vehicle 500, planning subsystem 502c may pass data indicating the derived behavior plan to control subsystem 502d. In turn, control subsystem 502d may be configured to transform the behavior plan for vehicle 500 into one or more control signals (e.g., a set of one or more command messages) for causing vehicle 500 to execute the behavior plan. For instance, based on the behavior plan for vehicle 500, control subsystem 502d may be configured to generate control signals for causing vehicle 500 to adjust its steering in a specified manner, accelerate in a specified manner, and/or brake in a specified manner, among other possibilities.

As shown, control subsystem 502d may then pass the one or more control signals for causing vehicle 500 to execute the behavior plan to vehicle-interface subsystem 502e. In turn, vehicle-interface subsystem 502e may be configured to translate the one or more control signals into a format that can be interpreted and executed by components of vehicle-control system 503. For example, vehicle-interface subsystem 502e may be configured to translate the one or more control signals into one or more control messages are defined according to a particular format or standard, such as a CAN bus standard and/or some other format or standard that is used by components of vehicle-control system 503.

In turn, vehicle-interface subsystem 502e may be configured to direct the one or more control signals to the appropriate control components of vehicle-control system 503. For instance, as shown, vehicle-control system 503 may include a plurality of actuators that are each configured to control a respective aspect of the vehicle's physical operation, such as a steering actuator 503a that is configured to control the vehicle components responsible for steering (not shown), an acceleration actuator 503b that is configured to control the vehicle components responsible for acceleration such as a throttle (not shown), and a braking actuator 503c that is configured to control the vehicle components responsible for braking (not shown), among other possibilities. In such an arrangement, vehicle-interface subsystem 502e of on-board computing system 502 may be configured to direct steering-related control signals to steering actuator 503a, acceleration-related control signals to acceleration actuator 503b, and braking-related control signals to braking actuator 503c. However, it should be understood that the control components of vehicle-control system 503 may take various other forms as well.

Notably, the subsystems of on-board computing system 502 may be configured to perform the above functions in a repeated manner, such as many times per second, which may enable vehicle 500 to continually update both its understanding of the surrounding environment and its planned behavior within that surrounding environment.

Although not specifically shown, it should be understood that vehicle 500 includes various other systems and components as well, including but not limited to a propulsion system that is responsible for creating the force that leads to the physical movement of vehicle 500.

Figure 6:
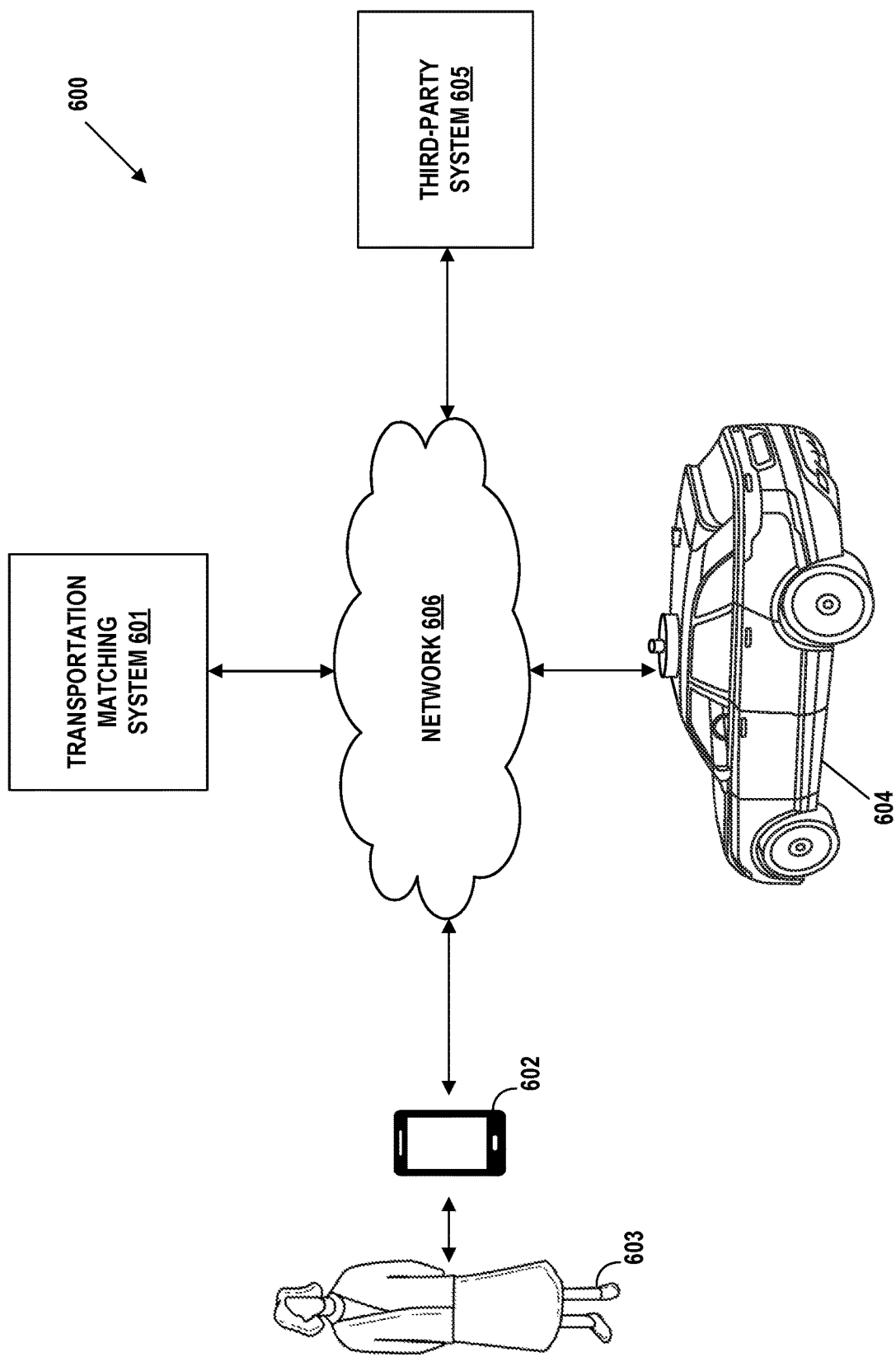
FIG. 6 a simplified block diagram that illustrates one example of a transportation-matching platform.

Turning now to FIG. 6, a simplified block diagram is provided to illustrate one example of a transportation-matching platform 600 that functions to match individuals interested in obtaining transportation from one location to another with transportation options, such as vehicles that are capable of providing the requested transportation. As shown, transportation-matching platform 600 may include at its core a transportation-matching system 601, which may be communicatively coupled via a communication network 606 to (i) a plurality of client stations of individuals interested in transportation (i.e., "transportation requestors"), of which client station 602 of transportation requestor 603 is shown as one representative example, (ii) a plurality of vehicles that are capable of providing the requested transportation, of which vehicle 604 is shown as one representative example, and (iii) a plurality of third-party systems that are capable of providing respective subservices that facilitate the platform's transportation matching, of which third-party system 605 is shown as one representative example.

Broadly speaking, transportation-matching system 601 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 601 may comprise computing infrastructure of a public, private, and/or hybrid cloud (e.g., computing and/or storage clusters). In this respect, the entity that owns and operates transportation-matching system 601 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 601 may comprise one or more dedicated servers. Other implementations of transportation-matching system 601 are possible as well.

As noted, transportation-matching system 601 may be configured to perform functions related to managing and facilitating transportation matching, which may take various forms. For instance, as one possibility, transportation-matching system 601 may be configured to receive transportation requests from client stations of transportation requestors (e.g., client station 602 of transportation requestor 603) and then fulfill such transportation requests by dispatching suitable vehicles, which may include vehicle 604. In this respect, a transportation request from client station 602 of transportation requestor 603 may include various types of information.

For example, a transportation request from client station 602 of transportation requestor 603 may include specified pick-up and drop-off locations for the transportation. As another example, a transportation request from client station 602 of transportation requestor 603 may include an identifier that identifies transportation requestor 603 in transportation-matching system 601, which may be used by transportation-matching system 601 to access information about transportation requestor 603 (e.g., profile information) that is stored in one or more data stores of transportation-matching system 601 (e.g., a relational database system), in accordance with the transportation requestor's privacy settings. This transportation requestor information may take various forms, examples of which include profile information about transportation requestor 603. As yet another example, a transportation request from client station 602 of transportation requestor 603 may include preferences information for transportation requestor 603, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 601 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 601 receives a request for transportation from San Francisco International Airport (SFO) to Palo Alto, California, system 601 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 601. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 601.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 601 could be configured to predict and provide transportation suggestions in response to a transportation request. For instance, transportation-matching system 601 may be configured to apply one or more machine-learning techniques to such historical data in order to "train" a machine-learning model to predict transportation suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 601 may only be capable of storing and later accessing historical data for a given transportation requestor if the given transportation requestor previously decided to "opt-in" to having such information stored. In this respect, transportation-matching system 601 may maintain respective privacy settings for each transportation requestor that uses transportation-matching platform 600 and operate in accordance with these settings. For instance, if a given transportation requestor did not opt-in to having his or her information stored, then transportation-matching system 601 may forgo performing any of the above-mentioned functions based on historical data. Other possibilities also exist.

Transportation-matching system 601 may be configured to perform various other functions related to managing and facilitating transportation matching as well.

Referring again to FIG. 6, client station 602 of transportation requestor 603 may generally comprise any computing device that is configured to facilitate interaction between transportation requestor 603 and transportation-matching system 601. For instance, client station 602 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 603 and transportation-matching system 601 (which may be embodied in the form of a software application, such as a mobile application, web application, or the like). In this respect, the interaction that may take place between transportation requestor 603 and transportation-matching system 601 may take various forms, representative examples of which may include requests by transportation requestor 603 for new transportation events, confirmations by transportation-matching system 601 that transportation requestor 603 has been matched with a vehicle (e.g., vehicle 604), and updates by transportation-matching system 601 regarding the progress of the transportation event, among other possibilities.

In turn, vehicle 604 may generally comprise any kind of vehicle that can provide transportation, and in one example, may take the form of vehicle 500 described above. Further, the functionality carried out by vehicle 604 as part of transportation-matching platform 600 may take various forms, representative examples of which may include receiving a request from transportation-matching system 601 to handle a new transportation event, driving to a specified pickup location for a transportation event, driving from a specified pickup location to a specified drop-off location for a transportation event, and providing updates regarding the progress of a transportation event to transportation-matching system 601, among other possibilities.

Generally speaking, third-party system 605 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 601.

Moreover, third-party system 605 may be configured to perform functions related to various subservices. For instance, as one possibility, third-party system 605 may be configured to monitor traffic conditions and provide traffic data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the vehicle's behavior plan, among other possibilities.

As another possibility, third-party system 605 may be configured to monitor weather conditions and provide weather data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the collection vehicle's behavior plan, among other possibilities.

As yet another possibility, third-party system 605 may be configured to authorize and process electronic payments for transportation requests. For example, after transportation requestor 603 submits a request for a new transportation event via client station 602, third-party system 605 may be configured to confirm that an electronic payment method for transportation requestor 603 is valid and authorized and then inform transportation-matching system 601 of this confirmation, which may cause transportation-matching system 601 to dispatch vehicle 604 to pick up transportation requestor 603. After receiving a notification that the transportation event is complete, third-party system 605 may then charge the authorized electronic payment method for transportation requestor 603 according to the fare for the transportation event. Other possibilities also exist.

Third-party system 605 may be configured to perform various other functions related to subservices that facilitate the platform's transportation matching as well. It should be understood that, although certain functions were discussed as being performed by third-party system 605, some or all of these functions may instead be performed by transportation-matching system 601.

As discussed above, transportation-matching system 601 may be communicatively coupled to client station 602, vehicle 604, and third-party system 605 via communication network 606, which may take various forms. For instance, at a high level, communication network 606 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 6 may take other forms as well, including the possibility that such communication paths include communication links and/or intermediate devices that are not shown.

In the foregoing arrangement, client station 602, vehicle 604, and/or third-party system 605 may also be capable of indirectly communicating with one another via transportation-matching system 601. Additionally, although not shown, it is possible that client station 602, vehicle 604, and/or third-party system 605 may be configured to communicate directly with one another as well (e.g., via a short-range wireless communication path or the like). Further, vehicle 604 may also include a user-interface system that may facilitate direct interaction between transportation requestor 603 and vehicle 604 once transportation requestor 603 enters vehicle 604 and the transportation event begins.

It should be understood that transportation-matching platform 600 may include various other entities and take various other forms as well.

Figure 7:
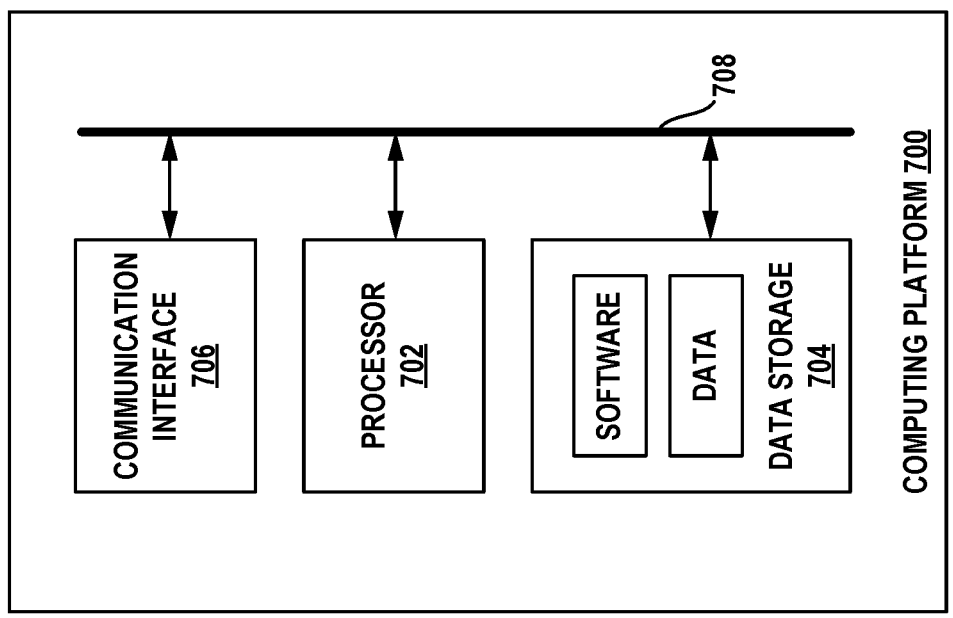
FIG. 7 is a simplified block diagram that illustrates some structural components that may be included in an example computing platform.

Turning now to FIG. 7, a simplified block diagram is provided to illustrate some structural components that may be included in an example computing platform 700, which may be configured to carry out the any of various functions disclosed herein—including but not limited to the functions included in the example pipeline described with reference to FIGS. 3 and 4A-4C. At a high level, computing platform 700 may generally comprise any one or more computer systems (e.g., one or more servers) that collectively include at least a processor 702, data storage 704, and a communication interface 706, all of which may be communicatively linked by a communication link 708 that may take the form of a system bus, a communication network such as a public, private, or hybrid cloud, or some other connection mechanism. Each of these components may take various forms.

For instance, processor 702 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 702 could comprise processing components that are distributed across a plurality of physical computing devices connected via a network, such as a computing cluster of a public, private, or hybrid cloud.

In turn, data storage 704 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 704 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 7, data storage 704 may be capable of storing both (i) program instructions that are executable by processor 702 such that the computing platform 700 is configured to perform any of the various functions disclosed herein (including but not limited to any the functions described with reference to FIGS. 3 and 4A-4C), and (ii) data that may be received, derived, or otherwise stored by computing platform 700. For instance, data storage 704 may include one or more of the vehicle trajectory information 307, agent trajectory information 308, non-agent information 309, and/or dynamic scene representations 311 shown in FIG. 3, among other possibilities.

Communication interface 706 may take the form of any one or more interfaces that facilitate communication between computing platform 700 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 700 may additionally include one or more input/output (I/O) interfaces that are configured to either (i) receive and/or capture information at computing platform 700 and (ii) output information to a client station (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 700 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
   obtaining first sensor data captured by a first sensor of a vehicle during a given period of operation of the vehicle;
   obtaining second sensor data captured by a second sensor of the vehicle during the given period of operation of the vehicle;
   accessing a combined map comprising (i) a first map layer corresponding to a first type of the first sensor and (ii) a second map layer corresponding to a second type of the second sensor, wherein the first and second map layers are aligned such that there is a known transformation between a first coordinate frame of the first map layer and a second coordinate frame of the second map layer;
   based on the first sensor data, localizing the first sensor within the first coordinate frame of the first map layer of the combined map;
   based on the second sensor data, localizing the second sensor within the second coordinate frame of the second map layer of the combined map;
   based on the known transformation between the first coordinate frame and the second coordinate frame, determining respective poses for the first sensor and the second sensor in a common coordinate frame;
   determining (i) a translation and (ii) a rotation between the respective poses for the first and second sensors in the common coordinate frame;
   determining a calibration between the first sensor and the second sensor based on the determined (i) translation and (ii) rotation between the respective poses for the first sensor and the second sensor in the common coordinate frame; and
   based on the determined calibration, carrying out an action that facilitates recalibration of the first and second sensors, wherein the action comprises at least one of (i) causing issuance of a notification to recalibrate the first or second sensors, (ii) causing the vehicle to pull over, or (iii) updating a previously determined calibration between the first and second sensors.

2. The computer-implemented method of claim 1, wherein the vehicle is stationary during the given period of operation.

3. The computer-implemented method of claim 1, further comprising:
   comparing (i) the determined translation to a previously determined translation between the respective poses for the first and second sensors in the common coordinate frame and (ii) the determined rotation to a previously determined rotation between the respective poses for the first and second sensors in the common coordinate frame.

4. The computer-implemented method of claim 3, further comprising:
   determining a difference between one or both of (i) the determined translation and the previously determined translation between the respective poses for the first and second sensors or (ii) the determined rotation and the previously determined rotation between the respective poses for the first and second sensors; and
   based on the difference, determining a change to the previously determined calibration between the first sensor and the second sensor.

5. The computer-implemented method of claim 4, further comprising:
   based on the difference between one or both of (i) the determined translation and the previously determined translation between the respective poses for the first and second sensors or (ii) the determined rotation and the previously determined rotation between the respective poses for the first and second sensors, updating the previously determined calibration between the first sensor and the second sensor to incorporate the difference.

6. The computer-implemented method of claim 4, further comprising:
   determining that the difference exceeds a threshold difference between one or both of (i) the determined translation and the previously determined translation between the respective poses for the first and second sensors or (ii) the determined rotation and the previously determined rotation between the respective poses for the first and second sensors; and
   based on determining that the difference exceeds the threshold difference, causing issuance of the notification to recalibrate the first or second sensors.

7. The computer-implemented method of claim 1, wherein the first sensor is a LiDAR unit and the first map layer is a LiDAR-based map layer, and wherein the second sensor is a camera and the second map layer is an image-based map layer.

8. The computer-implemented method of claim 1, wherein the common coordinate frame is one of the first coordinate frame of the first map layer or the second coordinate frame of the second map layer.

9. The computer-implemented method of claim 1, wherein the known transformation between the first coordinate frame and the second coordinate frame is determined during creation of the combined map.

10. The computer-implemented method of claim 1, wherein determining (i) the translation and (ii) the rotation between the respective poses for the first and second sensors in the common coordinate frame comprises determining a series of respective (i) translations and (ii) rotations between a series of respective poses for the first and second sensors in the common coordinate frame; and wherein determining the calibration between the first sensor and the second sensor based on the determined (i) translation and (ii) rotation between the respective poses for the first sensor and the second sensor in the common coordinate frame comprises determining the calibration between the first sensor and the second sensor based on the determined series of respective (i) translations and (ii) rotations.

11. A non-transitory computer-readable medium comprising program instructions stored thereon that are executable to cause a computing system to:

obtain first sensor data captured by a first sensor of a vehicle during a given period of operation of the vehicle;

obtain second sensor data captured by a second sensor of the vehicle during the given period of operation of the vehicle;

access a combined map comprising (i) a first map layer corresponding to a first type of the first sensor and (ii) a second map layer corresponding to a second type of the second sensor, wherein the first and second map layers are aligned such that there is a known transformation between a first coordinate frame of the first map layer and a second coordinate frame of the second map layer;

based on the first sensor data, localize the first sensor within the first coordinate frame of the first map layer of the combined map;

based on the second sensor data, localize the second sensor within the second coordinate frame of the second map layer of the combined map;

based on the known transformation between the first coordinate frame and the second coordinate frame, determine respective poses for the first sensor and the second sensor in a common coordinate frame;

determine (i) a translation and (ii) a rotation between the respective poses for the first and second sensors in the common coordinate frame;

determine a calibration between the first sensor and the second sensor based on the determined (i) translation and (ii) rotation between the respective poses for the first sensor and the second sensor in the common coordinate frame; and based on the determined calibration, carry out an action that facilitates recalibration of the first and second sensors, wherein the action comprises at least one of (i) causing issuance of a notification to recalibrate the first or second sensors, (ii) causing the vehicle to pull over, or (iii) updating a previously determined calibration between the first and second sensors.

12. The computer-readable medium of claim 11, wherein the vehicle is stationary during the given period of operation.

13. The computer-readable medium of claim 12, wherein the computer-readable medium further comprises program instructions stored thereon that are executable to cause the computing system to:

compare the determined translation to a previously determined translation between the respective poses for the first and second sensors in the common coordinate frame and (ii) the determined rotation to a previously determined rotation between the respective poses for the first and second sensors in the common coordinate frame.

14. The computer-readable medium of claim 13, wherein the computer-readable medium further comprises program instructions stored thereon that are executable to cause the computing system to:

determine a difference between one or both of (i) the determined translation and the previously determined translation between the respective poses for the first and second sensors or (ii) the determined rotation and the previously determined rotation between respective poses for the first and second sensors; and based on the difference, determine a change to the previously determined calibration between the first sensor and the second sensor.

15. The computer-readable medium of claim 14, wherein the computer-readable medium further comprises program instructions stored thereon that are executable to cause the computing system to:

based on the difference between one or both of (i) the determined translation and the previously determined translation between the respective poses for the first and second sensors or (ii) rotation and the previously determined rotation between the respective poses for the first and second sensors, update the previously determined calibration between the first sensor and the second sensor to incorporate the difference.

16. The computer-readable medium of claim 14, wherein the computer-readable medium further comprises program instructions stored thereon that are executable to cause the computing system to:

determine that the difference exceeds a threshold difference between one or both of (i) the determined translation and the previously determined translation between the respective poses for the first and second sensors or (ii) the determined rotation and the previously determined rotation between the respective poses for the first and second sensors; and based on determining that the difference exceeds the threshold difference, cause issuance of the notification to recalibrate the first or second sensors.

17. The computer-readable medium of claim 11, wherein the first sensor is a LiDAR unit and the first map layer is a LiDAR-based map layer, and wherein the second sensor is a camera and the second map layer is an image-based map layer.

18. The computer-readable medium of claim 11, wherein the common coordinate frame is one of the first coordinate frame of the first map layer or the second coordinate frame of the second map layer.

19. The computer-readable medium of claim 11, wherein the known transformation between the first coordinate frame and the second coordinate frame is determined during creation of a combined map.

20. A computing system comprising:

at least one processor;

a non-transitory computer-readable medium; and program instructions stored on the non-transitory computer-readable medium that are executable by the at least one processor such that the computing system is capable of:

obtaining first sensor data captured by a first sensor of a vehicle during a given period of operation of the vehicle;

obtaining second sensor data captured by a second sensor of the vehicle during the given period of operation of the vehicle;

accessing a combined map comprising (i) a first map layer corresponding to a first type of the first sensor and (ii) a second map layer corresponding to a second type of the second sensor, wherein the first and second map layers are aligned such that there is a known transformation between a first coordinate frame of the first map layer and a second coordinate frame of the second map layer;

based on the first sensor data, localizing the first sensor within the first coordinate frame of the first map layer of the combined map;

based on the second sensor data, localizing the second sensor within the second coordinate frame of the second map layer;

based on the known transformation between the first coordinate frame and the second coordinate frame, determining respective poses for the first sensor and the second sensor in a common coordinate frame;

determining (i) a translation and (ii) a rotation between the respective poses for the first and second sensors in the common coordinate frame;

determining a calibration between the first sensor and the second sensor based on the determined (i) translation and (ii) rotation between the respective poses for the first sensor and the second sensor in the common coordinate frame; and based on the determined calibration, carrying out an action that facilitates recalibration of the first and second sensors, wherein the action comprises at least one of (i) causing issuance of a notification to recalibrate the first or second sensors, (ii) causing the vehicle to pull over, or (iii) updating a previously determined calibration between the first and second sensors.

* * * * *